(12) United States Patent
Weinstein et al.

(10) Patent No.: US 12,086,764 B2
(45) Date of Patent: Sep. 10, 2024

(54) IMAGE ANALYSIS SYSTEM AND METHOD FOR DYNAMICALLY MODIFYING A RECIPE

(71) Applicant: Hungryroot, Inc., New York, NY (US)

(72) Inventors: Alex Weinstein, Bellevue, WA (US); Da Kong, Syosset, NY (US)

(73) Assignee: HUNGRYROOT, INC., New York, NY (US)

(*) Notice: Subject to any disclaimer, the term of this patent is extended or adjusted under 35 U.S.C. 154(b) by 0 days.

(21) Appl. No.: 18/159,542

(22) Filed: Jan. 25, 2023

(65) Prior Publication Data
US 2023/0289720 A1 Sep. 14, 2023

Related U.S. Application Data

(63) Continuation of application No. 17/689,814, filed on Mar. 8, 2022.

(51) Int. Cl.
*G06Q 10/087* (2023.01)
(52) U.S. Cl.
CPC ............... *G06Q 10/087* (2013.01)
(58) Field of Classification Search
CPC ............... G06Q 10/087; G06Q 50/12
See application file for complete search history.

(56) References Cited

U.S. PATENT DOCUMENTS

| | | |
|---|---|---|
| 9,165,320 B1 | 10/2015 | Belvin |
| 9,965,798 B1 | 5/2018 | Vaananen |
| 10,102,562 B1* | 10/2018 | Hughes ............... G06Q 30/0635 |
| 10,861,076 B1 | 12/2020 | Neumann |
| 2012/0136751 A1 | 5/2012 | Ochtel |
| 2012/0136864 A1* | 5/2012 | Ochtel ............... G06Q 30/0633 707/738 |
| 2012/0322032 A1 | 12/2012 | Smith |
| 2013/0124662 A1 | 5/2013 | Yamamoto et al. |
| 2014/0272816 A1 | 9/2014 | Callahan |
| 2014/0324607 A1* | 10/2014 | Frehn ..................... G06Q 50/12 705/15 |
| 2017/0139902 A1* | 5/2017 | Byron .................. G06Q 10/087 |
| 2017/0316488 A1 | 11/2017 | Kremen et al. |
| 2018/0096411 A1 | 4/2018 | Charles et al. |

(Continued)

OTHER PUBLICATIONS

Low-Sodium Recipes, https://www.allrecipes.com/recipes/1788/healthy-recipes/low-sodium/, accessed Feb. 8, 2022, 12 pages.

(Continued)

*Primary Examiner* — Florian M Zeender
*Assistant Examiner* — Vanessa Deligi
(74) *Attorney, Agent, or Firm* — Seed IP Law Group LLP

(57) ABSTRACT

Systems and methods to dynamically modify recipes for customers based actions while previously preparing other recipes. A first recipe is presented to a customer and images of the customer preparing the first recipe are captured. The images are analyzed to determine an action of the customer. A recipe characteristic associated with the action is determined based on the analysis of the images. A second recipe later selected for the customer, wherein the second recipe includes the determined recipe characteristic. The second recipe is modified to include a modification to the determined recipe characteristic based on the action of the customer when preparing the first recipe, and the modified second recipe is presented to the customer.

9 Claims, 11 Drawing Sheets

(56) References Cited

U.S. PATENT DOCUMENTS

| | | | |
|---|---|---|---|
| 2018/0114284 A1* | 4/2018 | Greenberger | G06F 16/9535 |
| 2018/0165747 A1 | 6/2018 | Patten et al. | |
| 2018/0218434 A1 | 8/2018 | Smith et al. | |
| 2018/0218461 A1 | 8/2018 | Pulley et al. | |
| 2019/0188776 A1 | 6/2019 | Hammond et al. | |
| 2019/0228855 A1 | 7/2019 | Leifer et al. | |
| 2019/0236678 A1 | 8/2019 | Wilkinson et al. | |
| 2019/0243922 A1* | 8/2019 | Pinel | G06F 16/24522 |
| 2019/0325501 A1* | 10/2019 | Jensen | G06F 3/0482 |
| 2020/0160214 A1 | 5/2020 | Ramakrishnan | |
| 2020/0302012 A1* | 9/2020 | Donati | G06F 40/205 |
| 2020/0311644 A1 | 10/2020 | Willard, III et al. | |
| 2020/0394727 A1 | 12/2020 | Shadrokh et al. | |
| 2021/0089608 A1 | 3/2021 | Gohil et al. | |
| 2021/0216603 A1* | 7/2021 | Ohtani | G06F 16/9538 |
| 2022/0059214 A1 | 2/2022 | Jung et al. | |
| 2022/0268523 A1* | 8/2022 | Babu | G08B 17/125 |

OTHER PUBLICATIONS

Yummly Recipes & Cooking Tools on the App Store, https://apps.apple.com/us/app/yummly-recipes-cooking-tools/id589625334, accessed Feb. 8, 2022, 4 pages.

Ahuja, "Build Faster Recipes with Less Clicks Using Multi-Step Actions in Workato," Workato Hacks, Feb. 2021, 15 pages.

Amaro, "Nutrially—Efficient and personalised meal recommendations," Mestrado Integrado em Bioengenharia, Jul. 29, 2021, 89 pages.

Bordera et al., "An Agent-Based Application for Automatic Classification of Food Allergies and Intolerances in Recipes," ResearchGate, Jan. 2016, 11 pages.

Cinicioglu et al., "A new heuristic for learning Bayesian networks from limited datasets: a real-time recommendation system application with RFID systems in grocery stores," Ann Oper Res, Jun. 21, 2012, 21 pages.

Tran et al., "An overview of recommender systems in the healthy food domain," CrossMark, Jun. 22, 2017, 27 pages.

"Yummly 2.0 Will Integrate Curated Cooking Experiences Into Whirlpool® Appliances," PR Newswire, Jan. 8, 2018, 3 pages.

Ueda et al., "User's food preference extraction for personalized cooking recipe recommendation," Workshop of ISWC, 2011, 5 pages.

Vivek et al., "Machine Learning Based Food Recipe Recommendation System," Proceedings of International Conference on Cognition and Recognition, 2018, 9 pages.

\* cited by examiner

IMAGE ANALYSIS SYSTEM AND METHOD FOR DYNAMICALLY MODIFYING A RECIPE

TECHNICAL FIELD

The present disclosure relates generally to content display systems and, more particularly, to utilizing artificial intelligence mechanisms to dynamically modify recipes.

BACKGROUND

Description of the Related Art

The use of online food and grocery ordering has gained in popularity over the past few years. Many of these online services allow customers to select which grocery items they wish to purchase using an online computer interface. After the customer selects and pays for their grocery items, a "runner" collects the items from the shelves such that the customer can simply pick up their order and take it home. Some systems also allow for the items to be sent directly to the customer's home. These systems, however, generally require the customer to know which grocery items they wish to purchase. Some newer systems have added the option of a customer selecting a particular recipe. The specific items and their portions for that particular recipe are then sent to the customer, along with a paper copy of the recipe. Upon arrival, the customer can prepare the recipe by following the instructions on the paper copy of the recipe and using the items provided. Unfortunately, many of these online food-purchasing systems are limited by the customer's input and provide little flexibility in how the grocery items and recipes are utilized. It is with respect to these and other considerations that the embodiments described herein have been made.

BRIEF SUMMARY

Briefly described, embodiments are directed toward systems and methods of dynamically modifying recipes for customers based on those customer's preferences inferred from prior actions, which may also be referred to as the customer's customizations, while previously using other recipes.

A recipe to provide to the customer is identified from a plurality of recipes, and its ingredients (underlying grocery items) are also identified. Previous customer customizations, as well as implicitly and explicitly inferred dietary preferences, are obtained for the customer. A determination is made whether at least one previous customer customization, or inferred preferences, is associated with at least one recipe characteristic. Recipe characteristics may include non-ingredient or non-item aspects of the recipe, such as cooking temperature, cooking time, recipe steps or instructions, order of cooking steps or instructions, etc. In response to determining that at least one previous customer customization, or inferred preference, is associated with at least one recipe characteristic, the recipe is modified based on such a determination. Moreover, a determination is made whether at least one previous customer customization is associated with at least one item in the plurality of items associated with the recipe. In response to determining that at least one previous customer customization is associated with at least one item, the recipe is modified based on the at least one previous customer customization that is associated with the at least one item. The modified recipe is then provided to a customer device of the customer.

The modification may include one or more modifications or combinations of modifications. An instruction in the recipe may be modified to substitute at least one item with at least one other item. An instruction in the recipe may be modified to increase or decrease a quantity of at least one item.

A cooking temperature or a cooking time associated with the recipe may be modified. An instruction in the recipe may be modified to increase or decrease a quantity of an item in the recipe. An instruction in the recipe may be modified to add a new item to the recipe that was previously not included in the recipe. An order of at least two instructions in the recipe may also be modified.

In some embodiments, the modifications may be made prior to providing the recipe to the customer. In other embodiments, the modifications may be made in real time as the customer is using the recipe and providing feedback on the recipe.

Embodiments described herein can improve the operation of the item delivery computing systems, reduce errors in item deliveries, improve customer satisfaction with the recipe in question or subsequent interactions with the system, reduce the amount of food waste in the customers' home and at the fulfillment warehouse, and even improve the operation of the various computing components of the system. As the customer customizes recipes, or inferred preferences are determined, and the system personalizes or customizes recipes for that customer, future computing resources are saved, while also reducing food waste. For example, if the system determines that the customer does not like salty food, the system can modify recipes prior to being provided to the customer so that the resulting food is not as salty. In this way, the customer does not throw out food that is deemed too salty and the customer's computing device saves computing resources by not having to modify the recipe or communicate with another computing device to report additional customizations. As another example, if the customer previously indicated that the fish was overcooked in a particular recipe, then future recipes can be modified to reduce the cooking time of fish for that customer, which can save electricity or gas with shorter cooking times.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various FIGS. unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
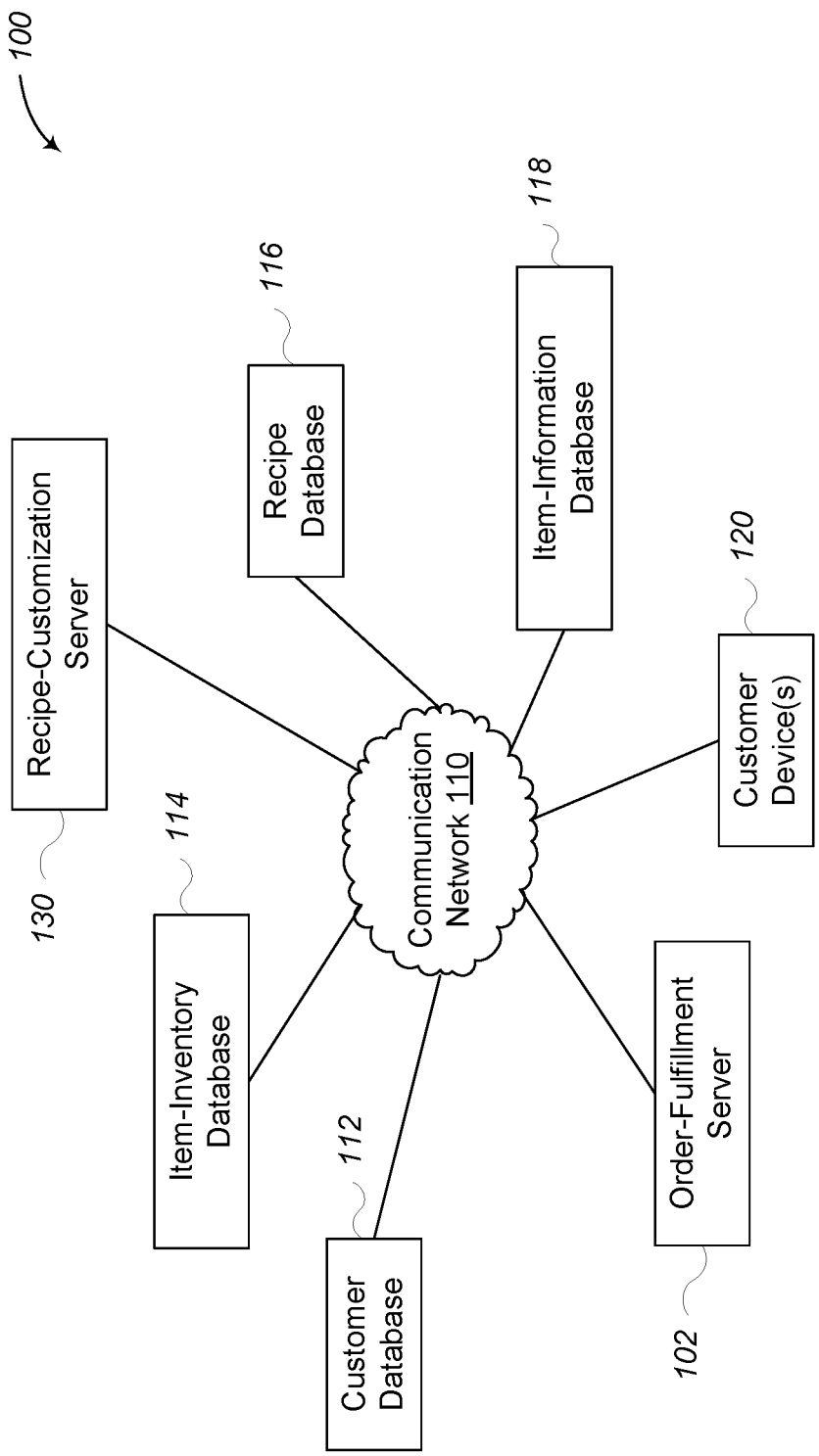
FIG. 1 illustrates a context diagram of an environment for predicting and optimizing customer recipe orders in accordance with embodiments described herein.

FIG. 1 illustrates a context diagram of an environment 100 for predicting and optimizing customer recipe orders in accordance with embodiments described herein. In this example, environment 100 includes an order-fulfillment server 102, a customer database 112, an item-inventory database 114, a recipe database 116, an item-information database 118, customer devices 120, and a recipe-customization server 130. These computing devices can communicate with one another via communication network 110. Communication network 110 includes one or more wired or wireless networks in which data or communication messages are transmitted between various computing devices.

The order-fulfillment server 102 is a computing device that predicts which recipes a customer of customer devices 120 may enjoy and optimize those recipes to select a set of recipes to provide to the customer. The order-fulfillment server 102 receives an order request from a customer device 120. Utilizes customer preferences and customer history information to predict a plurality of recipes for the customer. The order-fulfillment server 102 can then use hard constraints and soft constraints to optimize and score the predicted recipes into a plurality of sets of recipes. The order-fulfillment server 102 selects one of these sets of recipes to provide to the customer. The order-fulfillment server 102 can then initiate delivery of the items and recipes associated with the selected set of recipes to the customer to fulfill the order.

The recipe-customization server 130 is a computing device that collects, obtains, or utilizes previous customizations of a customer of customer device 1120 to dynamically modify recipes that are provided to that customer. The recipe-customization server 130 can receive customer customizations as a customer is using a recipe. The recipe-customization server 130 can later utilize those customizations, as well as customer database 112, to dynamically modify recipes before they are provided to the customer. In some embodiments, the recipe-customization server 130 can dynamically modify a recipe as a customer is using that recipe based on alterations or requests made by the customer while the customer, or their activity, uses the recipe.

The customer devices 120 are computing devices that can communicate with other computing devices to transmit or receive data. In some embodiments, the customer devices 120 can communicate with the order-fulfillment server 102 to provide customer preferences, request a recipe set and corresponding items be delivered to the customer, modify one or more items or recipes associated with a recipe set that is selected for delivery to the customer, etc. In other embodiments, the customer devices 120 can communicate with the recipe-customization server 130 to report customer customizations to recipes, request recipe modifications, or receive recipes that can be presented to the customer.

The customer database 112 is a computing device that is configured to store customer information. This customer information may include, but is not limited to, customer preferences, customer order history, customer customization history, list of items previously provided to the customer, current customer inventory (e.g., items or ingredients already owned by the customer), as well as inferred metadata properties about the customer, etc. The customer database 112 may be configured to communicate with the order-fulfillment server 102 via the communication network 110 to provide various customer information to the order-fulfillment server 102 to enable the order-fulfillment server 102 to predict and optimize recipes for customers, as described herein. The customer database 112 may be further configured to communicate with the recipe-customization server 130 via the communication network 110 to receive and store customer customizations and to provide previous customer customizations for dynamically modifying future recipes, as described herein.

The recipe database 116 is a computing device that is configured to store a plurality of recipes, which may include possible item or recipe modifications. The recipe database 116 is configured to communicate with the order-fulfillment server 102 via the communication network 110 to provide lists of recipes and their items to the order-fulfillment server 102 for the order-fulfillment server 102 to predict and optimize recipes for customers, as described herein. The recipe database 116 may also be configured to communicate with the recipe-customization server 130 via the communication network 110 to provide recipe information, along with possible item or recipe modifications, to the recipe-customization server 130 to dynamically modify recipes for customers, as described herein.

The item-inventory database 114 is a computing device configured to store inventory information regarding a plurality of items that are associated with at least one recipe stored by the recipe database 116 and can be delivered to a customer. The item-inventory database 114 is further configured to communicate with the order-fulfillment server 102 via the communication network 110 to provide item-inventory information to the order-fulfillment server 102 for the order-fulfillment server 102 to optimize recipes for customers, as described herein.

The item-information database 118 is a computing device that is configured to store information regarding the plurality of items that are associated with at least one recipe stored by the recipe database 116. This item information may include, but is not limited to, dietary information, specific ingredients, cost or price, volume metrics, possible item modifications or substitutions, etc. The item-information database 118 is further configured to communicate with the order-fulfillment server 102 via the communication network 110 to provide item information to the order-fulfillment server 102 for the order-fulfillment server 102 to optimize recipes for customers, as described herein. In some embodiments, the item-information database 118 may also be configured to communicate with the recipe-customization server 130 via the communication network 110.

Although the order-fulfillment server 102, the recipe-customization server 130, the customer database 112, the item-inventory database 114, the recipe database 116, and the item-information database 118 are illustrated as separate computing devices, embodiments are not so limited. Rather one or more computing devices or systems may be utilized to perform the functionality of the order-fulfillment server 102, the recipe-customization server 130, the customer database 112, the item-inventory database 114, the recipe database 116, and the item-information database 118. Accordingly, in some embodiments, the functionality of the order-fulfillment server 102 and the recipe-customization server 130 may be performed by one computing device. In other embodiments, the functionality of the order-fulfillment server 102 and the recipe-customization server 130 may be performed by a plurality of computing devices. Moreover, in some embodiments, some of the functionality of the recipe-customization server 130 may be performed on the customer devices 120.

Figure 2:
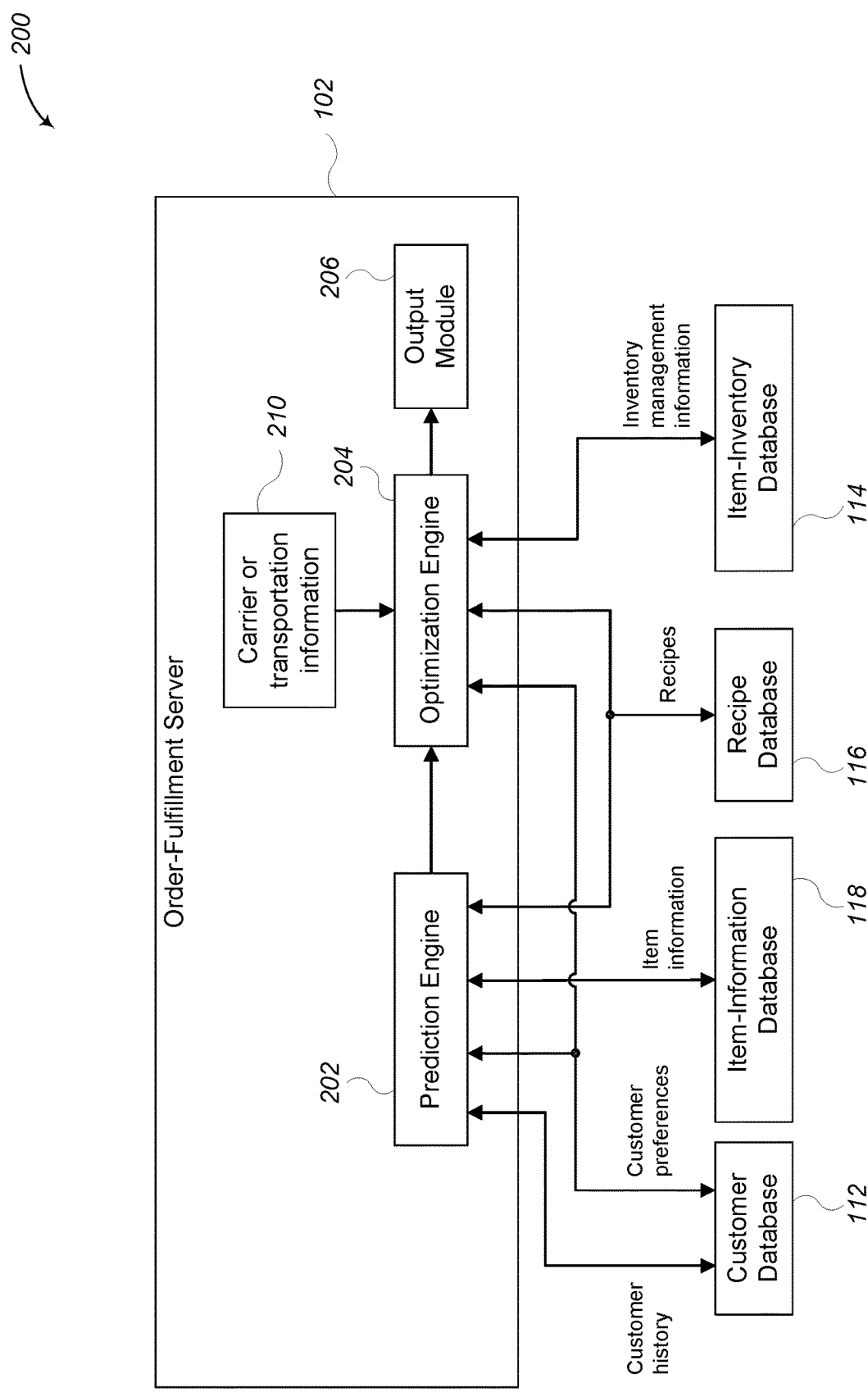
FIG. 2 is a context diagram of non-limiting embodiments of systems for obtaining data utilized in the predicting and optimizing of customer recipe orders in accordance with embodiments described herein.

FIG. 2 is a context diagram of non-limiting embodiments of systems for obtaining data utilized in the predicting and optimizing of customer recipe orders in accordance with embodiments described herein. Example 200 includes an order-fulfillment server 102, a customer database 112, an item-inventory database 114, a recipe database 116, and an item-information database 118, which are similar to what is discussed above in conjunction with FIG. 1.

The order-fulfillment server 102 includes a prediction engine 202, an optimization engine 204, and an output module 206. In some embodiments, the order-fulfillment server 102 may also store carrier or transportation information 210.

The prediction engine 202 receives an order request from a customer. The prediction engine 202 obtains a variety of customer-related information from the customer database 112. For example, the prediction engine 202 collects customer history information, customer preferences, and the customer's current inventory from the customer database 112. The prediction engine 202 also obtains a list of all possible recipes for the customer from the recipe database 116. The prediction engine 202 can use the list of recipes to collect item information for the recipes from the item-information database 118. This item information may include dietary information or specific ingredients for each recipe. In some embodiments, the item information may be included with the list of recipes received from the recipe database 116. The prediction engine 202 utilizes the recipes and the item information, along with the customer history and preferences, as input to one or more artificial intelligence learning models to predict which recipes the customer may like. The prediction engine 202 provides a list of predicted recipes to the optimization engine 204.

The optimization engine 204 queries the recipe database 116 to identify a list of items for each predicted recipe. The optimization engine 204 obtains additional item information for the listed from the item-information database 118. The optimization engine 204 can also obtain inventory management information for the listed items from the item-inventory database 114. The optimization engine 204 utilizes the predicted recipes, the additional item information, and the inventory information to optimize the predicted recipes, as described herein. In various embodiments, the optimization engine 204 also utilizes customer information (e.g., as obtained from customer database 112 to optimize the predicted recipes, which allows the system to not only select recipes that the customer may like, but also to select recipes that utilize items already owned by the customer. In some embodiments, the optimization engine 204 generates a plurality of sets of recipes, while evaluating each recipe set and individual recipe to one or more hard constraints. The optimization engine 204 discards those recipe sets that violate at least one hard constraint. The optimization engine 204 can then score the remaining predicted recipes using a plurality of soft constraints, as discussed herein.

In some embodiments, the optimization engine 204 can optimize recipe sets across a plurality of customers. For example, the prediction engine 202 can separately generate a plurality of predicted recipes for each of a plurality of customers. The optimization engine 204 separately evaluate each plurality of predicted recipes with respect to hard constraints and soft constraints. The optimization engine 204 can then evaluate one or more additional soft constraints that are evaluated among multiple pluralities of predicted recipes. One example of such a soft constraint may be inventory status relative to customer preferences. For example, if a first customer "likes" chicken and a second customer "loves" chicken, but the chicken inventory is low, then the recipe set scores for the first customer that include chicken may be reduced, and the recipe set scores for the second customer that include chicken may be increased.

In some embodiments, the optimization engine 204 can also use the carrier or transportation information 210 to optimize the predicted recipes. For example, if a carrier is delayed or if there are shipping issues regarding one or more items, then the optimization engine 204 can reduce the score of those recipe sets that include items that may experience shipping, transportation, or inventory issues. The optimization engine 204 provides a plurality of optimized recipe sets to the output module 206.

The output module 206 selects a set of recipes from the plurality of optimized recipe sets. In at least one embodiment, the output module 206 selects a highest scoring recipe set. The output module 206 can then initiate fulfillment of the customer's order with the items associated with the selected recipe set. In various embodiments, the output module 206 can provide digital copies of the selected recipe set to the customer's customer device 120. For example, the customer device 120 can execute an application that can receive the selected recipe set from the order-fulfillment server 102 and display the recipes to the customer when the customer is ready to use the recipes.

In some embodiments, the output module 206 may optionally present one or more of the plurality of optimized recipe sets to the customer prior to the fulfillment of the customer's order. In various embodiments, the output module 206 may display a selected number of highest scoring recipe sets to the customer, such as via customer device 120. In other embodiments, the output module 206 may identify two or more recipes that share one or more characteristics (e.g., cost, packaging size, cuisine, ingredient, etc.) and present those recipes to the customer. In at least one such embodiment, the system may enable the customer to select between one or more of these recipes to be included in the order. For example, the output module 206 may display a list of two pasta recipes, such that the customer can select one to include in the order.

The operation of certain aspects will now be described with respect to FIGS. 3-5. In at least one of various embodiments, processes 300, 400, or 500 described in conjunction with FIGS. 3-5, respectively, may be implemented by or executed via circuitry or on one or more computing devices, such as order-fulfillment server 102 in FIG. 1.

Figure 3:
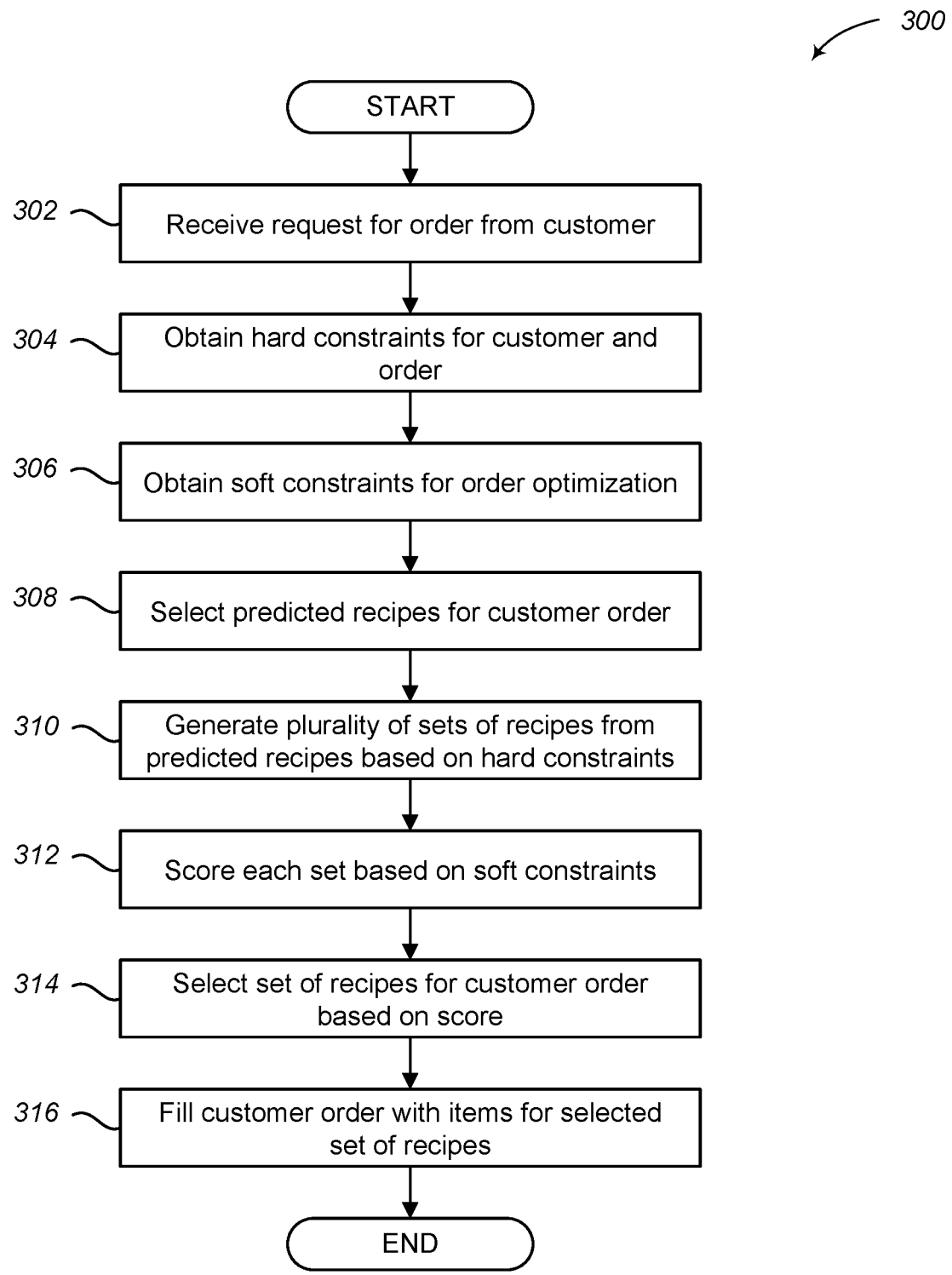
FIG. 3 illustrates a logical flow diagram showing one embodiment of a process for predicting and optimizing a customer recipe order in accordance with embodiments described herein.

FIG. 3 illustrates a logical flow diagram showing one embodiment of a process 300 for predicting and optimizing a customer recipe order in accordance with embodiments described herein.

Process 300 begins, after a start block, at block 302, where a request for an order is received from a customer. In various embodiments, the customer may setup or schedule orders for deliveries on specific days, at specific time intervals, or for specific occasions. As described herein, an order is a request for a set of recipes, and the items needed to make those recipes, to be delivered to the customer. Items are objects provided with the recipes for the customer to make the recipes. Items may include the various ingredients or food products needed to make the recipes. In some embodiments, items may also include cooking utensils, measurement tools, or other non-food objects needed to make the recipes.

Process 300 proceeds to block 304, where one or more hard constraints are obtained for the customer and the order. The hard constraints define at least one parameter that cannot be violated by a recipe or set of recipes for the customer. In various embodiments, the hard constraints may be in two groups, a first group of one or more hard constraints that are evaluated at the recipe-set level and a second group of one or more hard constraints that are evaluated at the recipe level. Accordingly, a set of a plurality of recipes selected for the customer may not violate a hard constraint from the first group of hard constraints and an individual recipe in a recipe set may not violate a hard constraint from the second group of hard constraints. Any violations of a hard constraint will result in the corresponding set of recipes to be discarded and not provided to the customer.

Examples, of hard constraints may include, but are not limited to:
  A recipe set cannot contain a recipe that includes an item that is an allergen to the customer (e.g., a recipe cannot contain an item that includes peanuts as an ingredient).
  A recipe set cannot contain a recipe that includes an item that is restricted by the customer (e.g., no chicken as an item). A customer may identify an item as being restricted because the customer does not like the item.
  A recipe set cannot contain a recipe or item prohibited by the customer (e.g., a recipe cannot include dairy products). A customer may identify a recipe or item as being prohibited because of a dietary restriction (e.g., the customer is allergic to an ingredient in the item or recipe).
  A recipe set cannot have a cost that exceeds a customer-selected or company-defined or administrator-selected maximum cost.
  A recipe set cannot have a total packaging volume exceeding a maximum volume (e.g., the items for a set of recipes cannot exceed a selected shipping-box volume).
  A recipe set cannot have a total number of items that exceeds a maximum number of items.
  A recipe set cannot include an item have more servings than a select threshold.

These examples of hard constraints are for illustrative purposes and are not intended to be limiting. In various embodiments, the hard constraints may be input or modified by an administrator.

Process 300 continues to block 306, where one or more soft constraints are obtained for order optimization. The soft constraints define at least one parameter that expresses a tradeoff value associated with a recipe or set of recipes for the customer. As discussed in more detail herein, the soft constraints may be utilized to score a recipe or set of recipes. Accordingly, evaluation of one or more soft constraints may result in an increase or a reduction of a recipe set score.

Examples of soft constraints may include, but are not limited to:
  Item inventory relative to a minimum or maximum inventory:
    An item that is out of stock or under an inventory minimum (e.g., recipe set score be decreased if an item of a recipe in that recipe set is out of stock—so as to discourage use of that item in a recipe set).
    An item that is in stock or over an inventory maximum (e.g., a recipe set score may be increased if the inventory of an item of a recipe in that recipe set exceeds an inventor maximum—so as to encourage use of that item in a recipe set to reduce the inventory of that item).
  A recipe set having a cost that exceeds a minimum or maximum customer-selected cost (e.g., a recipe set score may be decreased a first amount if the recipe set has an aggregated item price that exceeds the customer-selected maximum cost, and the recipe set score may be decreased a second, smaller amount if the recipe set has an aggregated item price that exceeds the customer-selected minimum cost).

A recipe set that exceeds a maximum or minimum number of meals for the customer (e.g., a recipe set score may be decreased a first amount if the recipe set includes a number of meals less than a customer-selected number of meals, and the recipe set score may be decreased a second, smaller amount if the recipe set includes a number of meals over the customer-selected number of meals).

A recipe set that has an incorrect number of servings for different customer-selected mealtimes (e.g., a recipe set score may be decreased one or more amounts based on a type of serving missing for different mealtimes).

A recipe set that includes multiple recipes having at least one overlapping item (e.g., a recipe set score may be decreased for each duplicate item among recipes in the recipe set).

A recipe set having a recipe that was previously provided to the customer (e.g., a recipe set score may be decreased a first amount for a repeated recipe within a first threshold amount of time, or the recipe set score may be decreased a second, higher amount for a repeat of two or more recipes from a same set within a second, longer threshold amount of time).

A recipe set matching at least one customer preference (e.g., a recipe set score may be increased a first amount if an item or recipe in the recipe set matches a first customer preference, and the recipe score may be increased a second, higher amount if an item or recipe in the recipe set matches a second customer preference).

A recipe set failing to match at least one customer preference (e.g., a recipe set score may be decreased a first amount if an item or recipe in the recipe set fails to match a first customer preference, and the recipe score may be decreased a second, higher amount if an item or recipe in the recipe set fails to match a second customer preference).

A recipe set score relative to aggregated customer feedback.

Customers "liking" or "disliking" a recipe in the recipe set.

Customers "liking" or "disliking" an item or ingredient associated with a recipe in the recipe set.

A recipe set containing items already owned by the customer.

These examples of soft constraints are for illustrative purposes and are not intended to be limiting. In various embodiments, the soft constraints may be input or modified by an administrator.

Process 300 proceeds next to block 308, where a plurality of predicted recipes are selected for the customer order, which is described in more detail below in conjunction with FIG. 4. Briefly, however, customer preferences and the customer's order history are utilized to predict which recipes the customer should enjoy.

Process 300 continues at blocks 310 and 312, where the plurality of predicted recipes are optimized for the customer's order.

First, at block 310, a plurality of sets of recipes are generated from the plurality of predicted recipes, which is described in more detail below in conjunction with FIG. 5. Briefly, however, each recipe and set of recipes is compared to the hard constraints to determine which recipe sets satisfy the hard constraints.

Second, at block 312, each recipe set is scored based on the soft constraints. In some embodiments, an inventory of items for each item associated with a recipe in the generated recipe sets is obtained from an inventory database, such as item-inventory database 114 in FIG. 1. Similarly, the customer's preferences may be obtained from a customer database, such as customer database 112 in FIG. 1.

Each recipe set is compared to the soft constraints, and a recipe set score is modified based on how well that recipe set follows the soft constraints. For example, if the cost of a recipe set exceeds the customer-selected maximum cost, then the score for that recipe set is reduced an amount determined by that soft constraint. As another example, the score for a recipe set may be modified based on whether the customer, or other customers, have "liked" or "disliked" specific recipes or items (e.g., specific ingredients or specific instructions or specific utensils needed to execute the recipe) associated with the recipe set. As another example, the customer may provide information regarding currently owned items. The score of a recipe set may be increased if the customer already owns an item associated with the recipe set.

Process 300 proceeds next to block 314, where a set of recipes is selected for the customer order based on the scores generated at block 312. In various embodiments, a highest scoring recipe set is selected for the customer order. In other embodiments, a recipe set is randomly selected from those recipe sets having a score above a selected threshold. This threshold may be selected or set by an administrator or by the customer. For example, a customer may lower the score threshold to introduce more variety into the recipe sets being selected for the customer. Conversely, the customer may raise the score threshold to reduce variety and cause the system to select recipe sets that more closely align with the customer's preferences or history.

In some embodiments, the set of recipes may be modified based on previous customer customizations may be the customer associated with the order, as described herein.

Process 300 continues to block 316, where the customer order is filled with items for the selected set of recipes. In some embodiments, automated item selection robotic mechanisms may be controlled to select the items from one or more shelves in an item warehouse and fill a delivery box with those items. In other embodiments, a list of items for the selected set of recipes is output to a warehouse worker to enable that worker to collect the items and fill the delivery box.

After block 316, process 300 may terminate or otherwise return to a calling process to perform other actions. For example, in some embodiments, process 300 may loop (not illustrated) to block 302 to receive another order request for the same customer or for a different customer.

Figure 4:
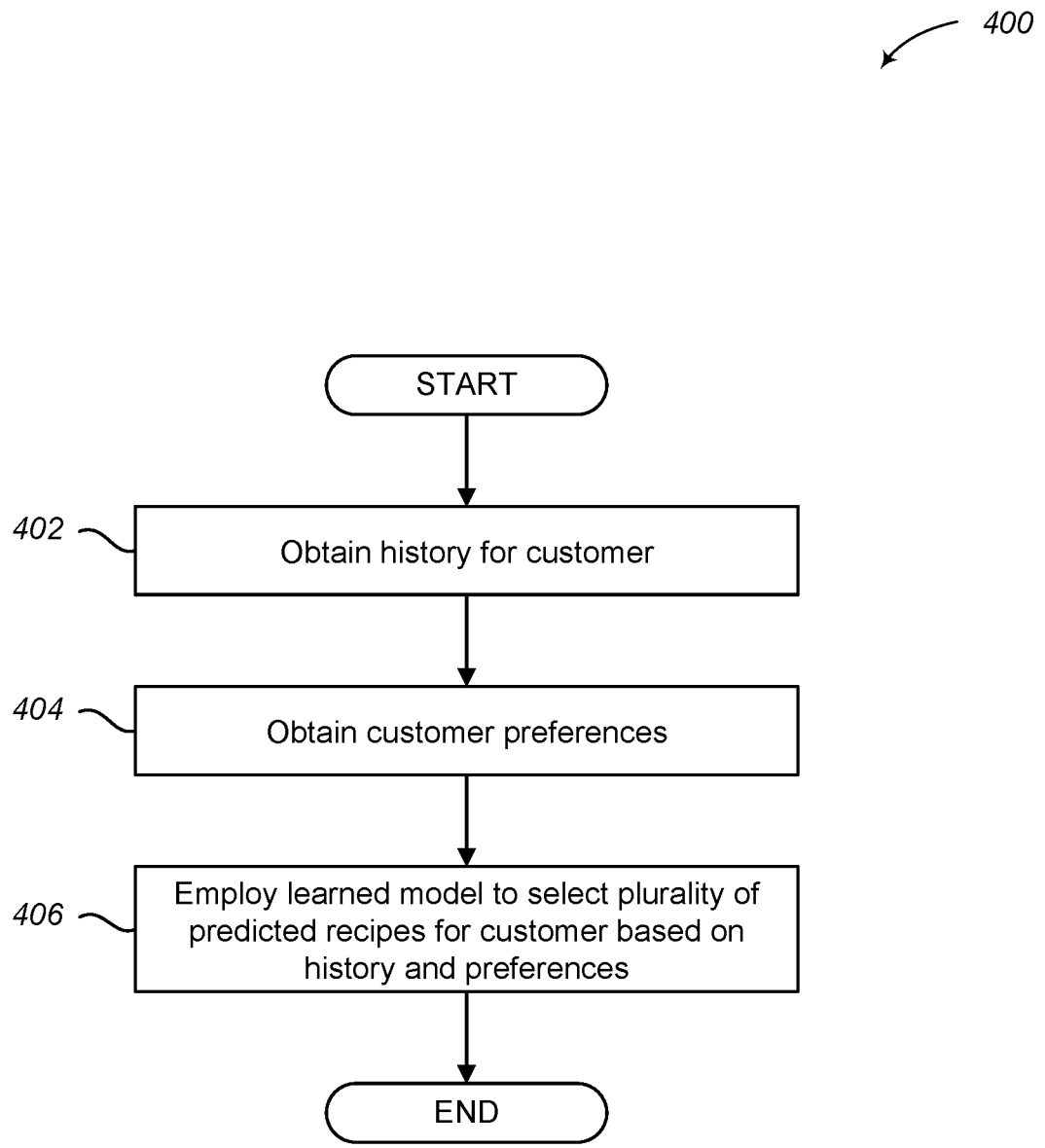
FIG. 4 illustrates a logical flow diagram showing one embodiment of a process for predicting recipes for a customer in accordance with embodiments described herein.

FIG. 4 illustrates a logical flow diagram showing one embodiment of a process 400 for predicting recipes for a customer in accordance with embodiments described herein. As mentioned above, process 400 may be performed at block 308 in FIG. 3.

Process 400 begins, after a start block, at block 402, where a history for the customer is obtained. In various embodiments, the customer's history includes previous recipes selected for the customer, ratings provided by the customer on previous recipes, ratings provided by the customer on previous recipe combinations in a set of recipes, previous alterations or customizations provided by the customer, etc. For example, the customer history may indicate that each previously selected recipe containing beef is modified by the customer to exchange the beef for chicken. As another example, the customer history may indicate that the customer gives high ratings to recipe sets that include Italian recipes with French recipes in the same set. Other customer history information can also be obtained.

Process 400 proceeds to block 404, where one or more customer preferences are obtained. In various embodiments, these customer preferences are selected by the customer when the customer signs up to have recipe sets and corresponding items delivered to the customer. In other embodiments, the customer preferences are automatically generated based on questions answered by the customer. In yet other embodiments, the customer preferences may be inferred from the customer's actions or interactions with the system. The customer preferences may include, but are not limited to customer dietary preferences, customer dietary restrictions, customer configurations (e.g., number of servings per recipe, preferred cuisines, etc.), Process 400 continues at block 406, where a learned model is employed to select a plurality of predicted recipes for the customer based on the customer history and the customer preferences.

In various embodiments, the model is trained using one or more artificial intelligence or machine learning techniques. The training data may include item attributes, recipe attributes (e.g., items or ingredients, item quantities, number of steps, preparation time, cook time, etc.), customer dietary preferences, customer dietary restrictions, customer configurations, and past customer customizations of items from a plurality of customers for a plurality of previously selected recipes for those customers. The item attributes may include information describing various aspects of an item, which may include a list of ingredients, dietary information (e.g., number of calories, amount of sugar, amount of fat, etc.), allergens, dietary restrictions (e.g., vegan, dairy free, gluten free, etc.), or other information regarding the item. The customer dietary preferences may include a customer's food likes and dislikes, such as the types of cuisines the customers like or dislike, specific food items that the customer would prefer or would prefer to not have, etc. The customer dietary restrictions may include different types of diets, food fads, common food allergies (e.g., nut allergies, dairy allergies, or oral allergy syndrome), etc. of a customer. The customer configurations may include selections and preferences of a customer, such as the number of meals, types of meals (e.g., dinner, lunch, breakfast, snack, or dessert), requested numbers of recipes in a set of recipes, etc. The past customer customizations may include information indicating which recipe or item alterations, exchanges, or changes a customer has made to specific recipes. In some embodiments, the training data may also include customer feedback, such as how the customer rated or liked items or recipes that they have previous received. In other embodiments, the training data may include customer attributes that are not directed related to recipes or items or information inferred about a customer, such as demographics, geographic location, income and budget, etc.

In some embodiments, the model may be trained for specific geographic area, for specific dietary needs, for specific customer demographics, or other grouping criteria. In this way, the predicted recipes may be more closely tailored to the customer.

After block 406, process 400 may terminate or otherwise return to a calling process to perform other embodiments. For example, process 400 may return the predicted recipes to process 300 in FIG. 3 for further processing.

Figure 5:
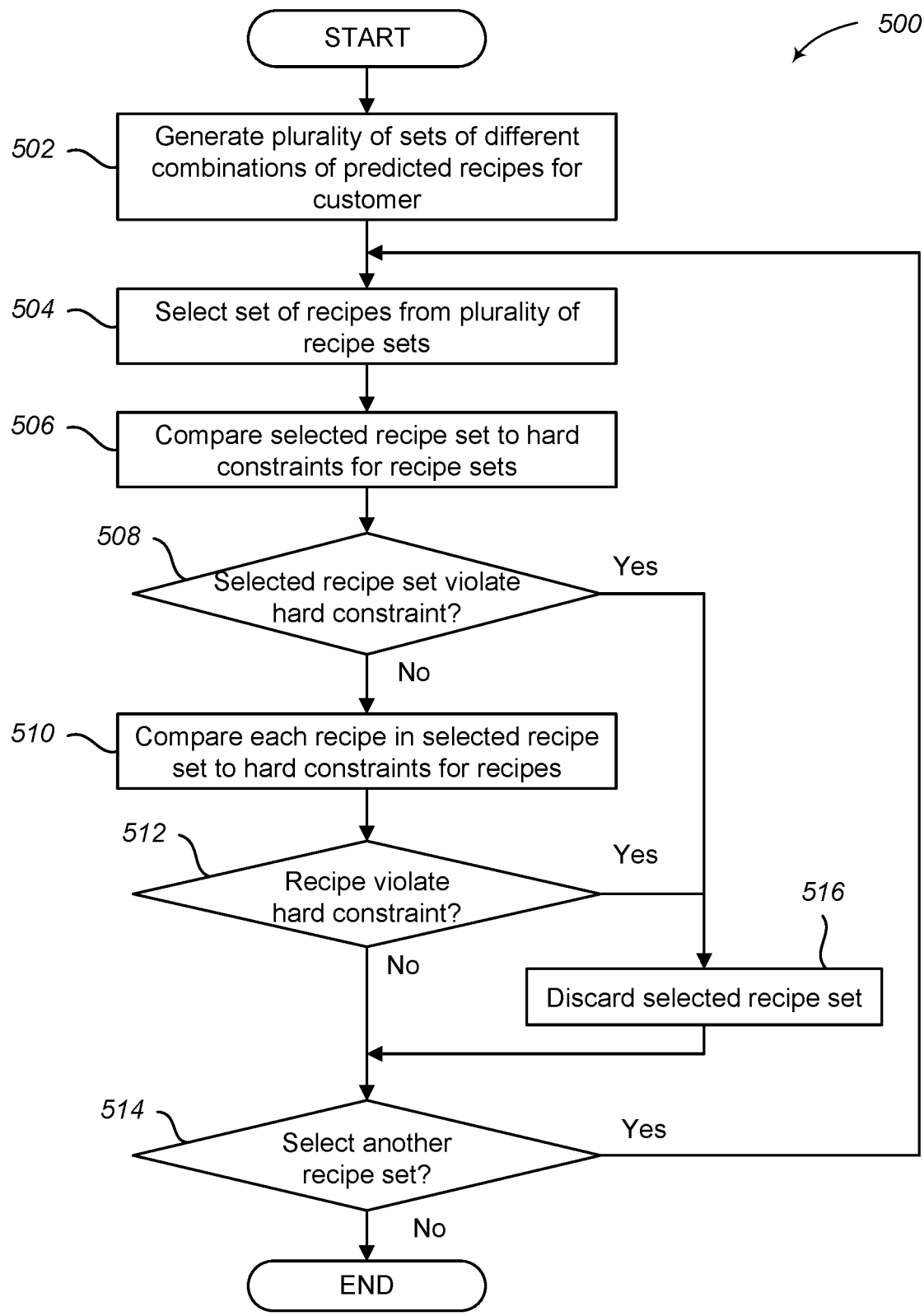
FIG. 5 illustrates a logical flow diagram showing one embodiment of a process for optimizing and scoring predicted recipes for a customer in accordance with embodiments described herein.

FIG. 5 illustrates a logical flow diagram showing one embodiment of a process 500 for scoring predicting recipes for a customer in accordance with embodiments described herein. As mentioned above, process 500 may be performed at block 310 in FIG. 3.

Process 500 begins, after a start block, at block 502, where a plurality of sets of different combinations of predicted recipes is generated. The predicted recipes may be generated as discussed above, such as in conjunction with FIG. 4. A set of recipes is a set that includes one or more recipes. In various embodiments, each possible combination of predicted recipes is generated.

Process 500 proceeds to block 504, where a set of recipes is selected from the plurality of sets of recipes. Each recipe set may be selected in a logical order such that each recipe set is compared to the hard constraints.

Process 500 continues at block 506, where the selected recipe set is compared to the hard constraints for recipe sets. As discussed herein, the hard constraints may be in two groups, a first group of one or more hard constraints that are evaluated at the recipe-set level and a second group of one or more hard constraints that are evaluated at the recipe level. At block 506, the selected recipe set is compared to or evaluated with respect to the first group of hard constraints at the recipe-set level.

In various embodiments, one or more pieces of information associated with each recipe or each item of each recipe of the selected recipe set is obtained, analyzed, and compared to the hard constraints. For example, the selected recipe set may be analyzed to ensure that the selected recipe set does not have a cost that exceeds a customer-selected maximum cost. Similarly, the selected recipe set may be analyzed to ensure that the total packaging volume of all the items for each recipe in the selected recipe set does not exceed a maximum packaging volume. As another example, the selected recipe set may be analyzed to ensure that the total number of items associated with the selected recipe set does not exceed a maximum number of items. These examples are for illustrative purposes and other hard constraints may be employed and evaluated on the selected recipe set.

Process 500 proceeds next to decision block 508, where a determination is made whether the selected recipe set violates at least one hard constraint. If the selected recipe set violates at least one hard constraint, then process 500 flows to block 516; otherwise, process 500 flows to block 510.

At block 510, each recipe associated with the selected recipe set is individually compared to the second group of hard constraints that are evaluated at the recipe level. In various embodiments, one or more pieces of information associated with each recipe or each item of each recipe of the selected recipe set is obtained, analyzed, and compared to the hard constraints. For example, each recipe in the recipe set may be analyzed to ensure that no recipe in the recipe set includes an item that is an allergen to the customer. Similarly, each recipe in the recipe set may be analyzed to ensure that no recipe includes an item that is restricted or prohibited by the customer. A restricted item may be an item that the customer really does not want (e.g., the customer hates the taste of tofu), whereas a prohibited item may be an item that the customer cannot consume (e.g., the customer is allergic to peanuts). These examples are for illustrative purposes and other hard constraints may be employed and evaluated on each recipe for the selected recipe set.

Process 500 continues as decision block 512, where a determination is made whether a recipe in the selected recipe set violates at least one hard constraint. If at least one recipe violates at least one hard constraint, then process 500 flows to block 516; otherwise, process 500 flows to decision block 514.

At block 516, the selected recipe set is determined to be in violation of at least one hard constraint and is therefore discarded from the sets of recipes that can be selected and provided to the customer. After block 516, process 500 flows to decision block 514.

At decision block 514, a determination is made whether another recipe set is selected from the plurality of sets of recipes. In some embodiments, each recipe set is selected and compared to the hard constraints. If another recipe set is to be selected, process 500 loops to block 504; otherwise, process 500 terminates or otherwise returns to a calling process to perform other actions. For example, process 500 can return to process 300 in FIG. 3 to select one of the remaining recipe sets to provide to the customer.

Figure 6:
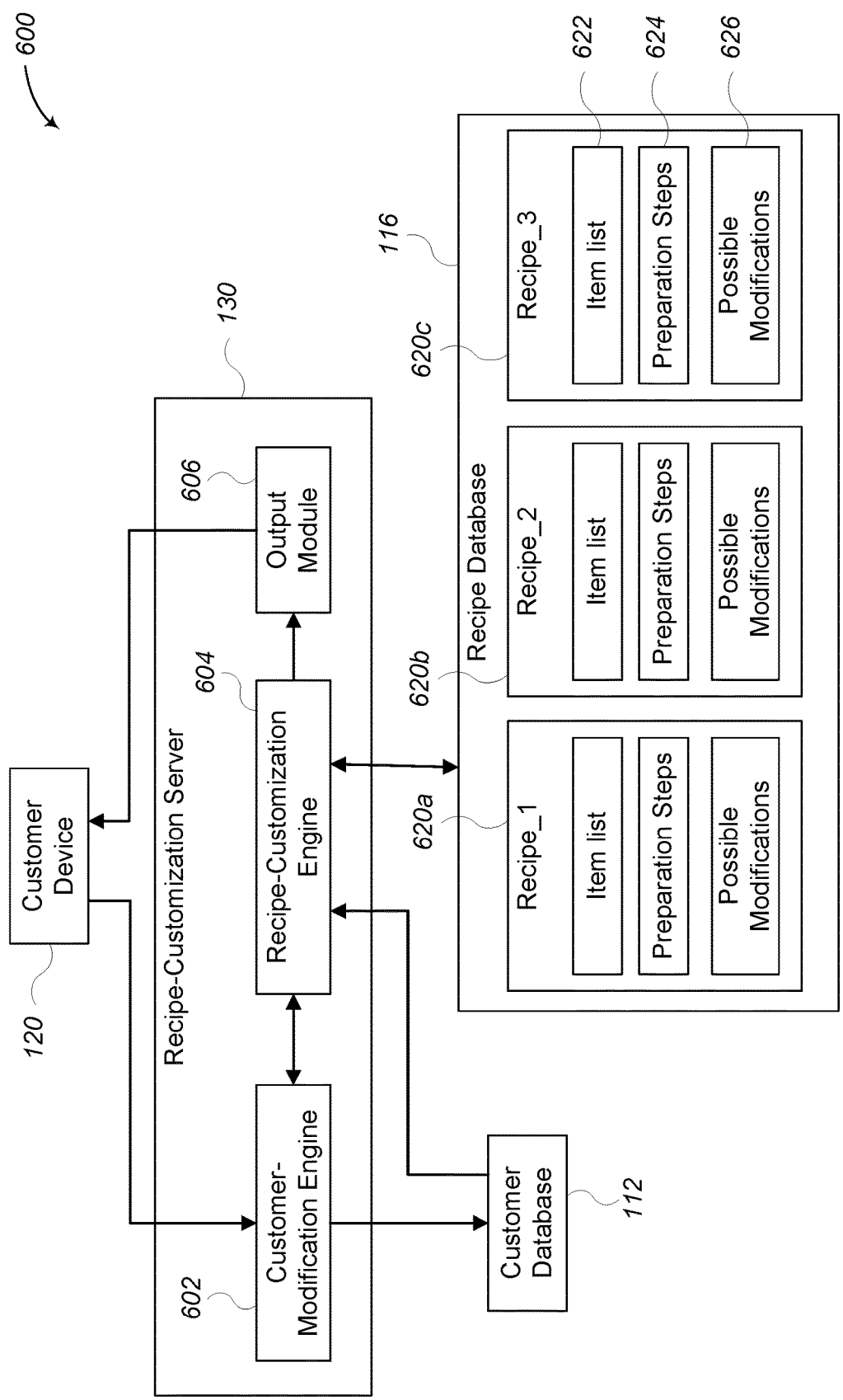
FIG. 6 is a context diagram of non-limiting embodiments of systems for obtaining customer modifications and dynamically modifying recipes for that customer in accordance with embodiments described herein.

FIG. 6 is a context diagram of non-limiting embodiments of systems for obtaining customer modifications and dynamically modifying recipes for that customer in accordance with embodiments described herein. Example 600 includes a recipe-customization server 130, a customer database 112, and a recipe database 116, which are similar to what is discussed above in conjunction with FIGS. 1 and 2.

The recipe database 116 stores a plurality of recipes 620a-620c. Each recipe 620 includes an item list 622, preparation steps 624, and possible modifications 626. The item list 622 identifies each item used in the recipe. The preparation steps 624 identify each step or instruction that is to be provided to the customer to indicate how to prepare the recipe. The possible modifications 626 may include a list of item modifications or recipe characterization modifications can be made to the recipe. Such modifications may be specific modifications, such as to substitute one item for another, or they may be ranges or other boundaries, such as to modify cooking time by a specific number of minutes selected from one to five minutes depending on customer preferences or previous customizations.

The recipe-customization server 130 includes a customer-modification engine 602, a recipe customization engine 604, and an output module 606. The customer-modification engine 602 receives customer input or customer customizations from a customer device 120. In some embodiments, the customer-modification engine 602 may employ one or more machine learning techniques to generate customer customizations based on the inputs provided by the customer while the customer is using one or more recipes. The customer-modification engine 602 can store the customer customizations for each separate customer in the customer database 112, such as with the customer's preferences. As discussed below, the customer customizations can be changes to item amounts, substitutions, changes to recipe instructions, feedback on taste, feedback on cooking difficulty, etc.

The recipe-customization engine 604 obtains the customer customizations from the customer database 112 or the customer-modification engine 602. The recipe-customization engine 604 utilizes the previous customer customizations to modify a recipe before it is provided to the customer device 120. In some embodiments, the recipe-customization engine 604 may also modify a recipe as it is being used by the customer and the customer provides input regarding the recipe. In various embodiments, the recipe-customization engine 604 communicates with the recipe database 116 to obtain information regarding the recipes. For example, the recipe-customization engine 604 can obtain a list of items 622 for the recipe, preparation steps or instructions 624 for the recipe, and possible item modifications 626. After the recipe-customization engine 604 generates a modified recipe for the customer, the recipe-customization engine 604 provides the modified recipe to the output module 606.

The output module 606 is configured to provide modified recipes to the customer device 120 for display to the customer. In some embodiments, the output module 606 may coordinate recipe modifications for the customer before the recipe is provided to the customer device 120 or in real time as the customer is using the recipe.

In various embodiments, the functionality of the recipe-customization server 130 may be performed by the customer device 120 without the use of a separate or remote server.

The operation of certain aspects will now be described with respect to FIGS. 7, 8, and 9A-9B. In at least one of various embodiments, processes 700, 800, and 900 described in conjunction with FIGS. 7, 8, and 9A-9B, respectively, may be implemented by or executed via circuitry or performed on one or more computing devices, such as customer devices 120 or recipe-customization server 130 in FIG. 1. In some embodiments, processes 700 and 800 may be implemented by or executed on customer devices 120 and process 900 may be implemented by or executed on recipe-customization server 130.

Figure 7:
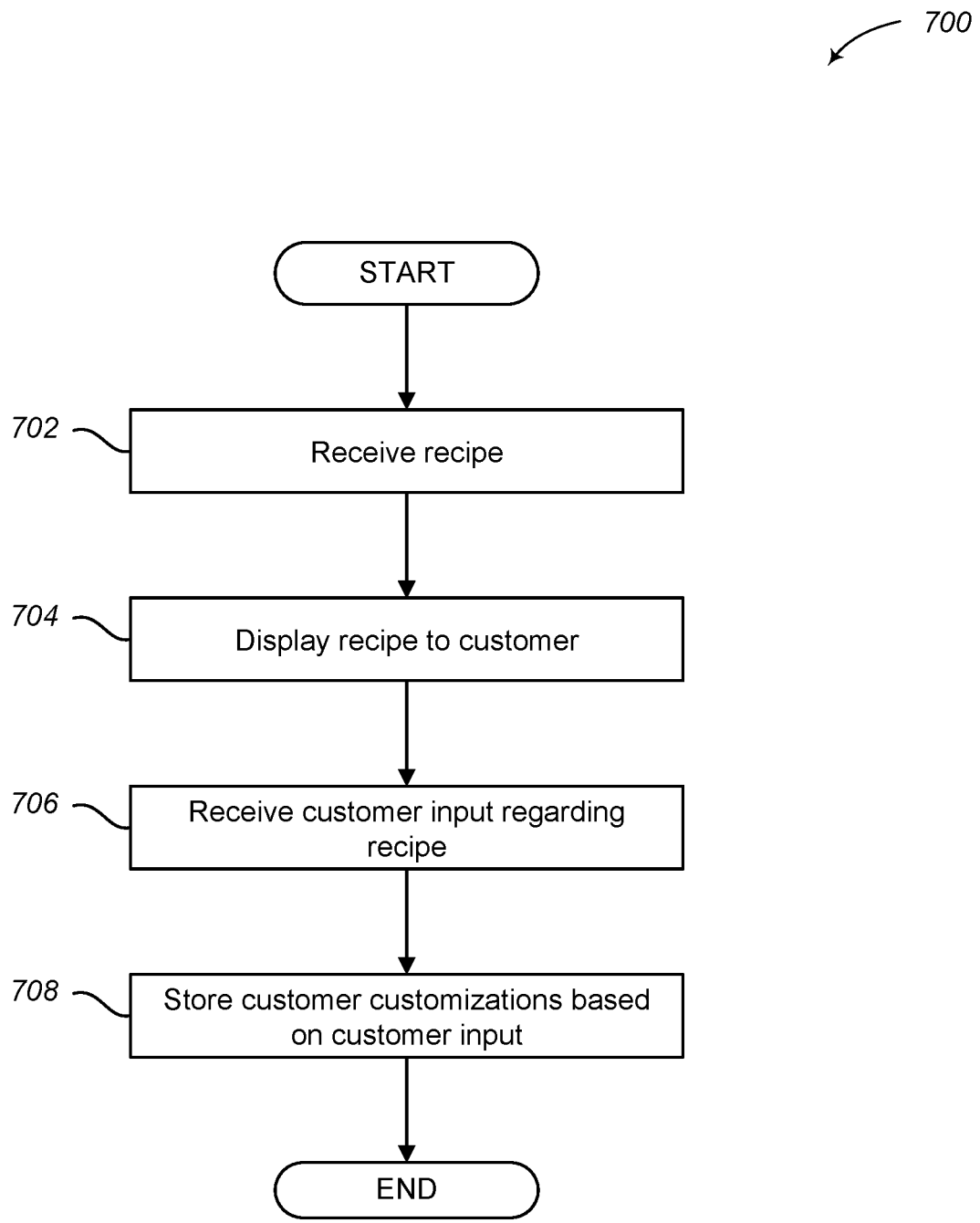
FIG. 7 illustrates a logical flow diagram showing one embodiment of a process for obtaining customer customizations to a recipe in accordance with embodiments described herein.

FIG. 7 illustrates a logical flow diagram showing one embodiment of a process 700 for obtaining customer customizations to a recipe in accordance with embodiments described herein.

Process 700 begins, after a start block, at block 702, where a recipe is received. In some embodiments, the recipe is received as part of a set of recipes associated with a customer order, as described above. In other embodiments, the customer may individually select the received recipe from a list of recipes.

Process 700 proceeds to block 704, where the recipe is displayed to the customer. In some embodiments, the entire recipe is presented to the customer such that the customer can view or scroll to view the recipe, similar to the recipe being on a single sheet of paper. In other embodiments, the recipe may be presented to the customer as a series of multiple screens, where each screen includes one or more steps or instructions associated with the recipe. For example, a first screen may provide instructions for pre-heating an oven and collecting utensils needed for the recipe. A second screen may then provide a first step or two steps for mixing a first few ingredients. The customer can move between screens by pushing forward or back buttons or by swiping an interactive display screen to the left or right. Other graphical user interfaces may also be used to display the recipe to the customer and to enable the customer to view or interact with the recipe.

Process 700 proceeds to block 706, where customer input is received regarding the recipe. The customer input may indicate a modification made by the customer or other feedback regarding the recipe.

In some embodiments, the input may be a modification associated with specific items in the recipe. For example, the customer input may indicate that the customer modified a quantity or amount of an ingredient in the recipe, such as by using less onions than what the recipe called for. As another example, the customer input may indicate that the customer substituted one ingredient for another ingredient, such as using ground turkey instead of ground beef as called for by the recipe. As another example, the customer input may indicate that the customer added an ingredient, such as adding soy sauce even though the recipe did not call for it. As yet another example, the customer input may indicate that the customer used a microwave instead of a conventional oven, or the customer used a grill instead of a stovetop. In yet another example, the input from the customer may be implicit, for example, the amount of time they spent execution a specific step in the recipe before proceeding to the next step.

In other embodiments, the input may be associated with a characteristic of the recipe. In some embodiments, the characteristics may be associated with the taste of the recipe. For example, the customer input may indicate that the customer thought the recipe was too spicy or too salty. In other embodiments, the characteristics may be associated with an instruction in the recipe. For example, the customer input may indicate that the customer seared the meat using "heat 3" instead of "medium-high" as stated in the recipe or that chopping tomatoes was too difficult. In yet other embodiments, the characteristics may be associated with some other aspect of the recipe, such as not enough portions, recipe was too difficult to execute, etc.

In some embodiments, the customer input may be received after the customer has completed using the recipe, such as after the corresponding dish is made. In other embodiments, the customer input may be provided in real time as the customer is using the recipe. For example, assuming the recipe includes an instruction to brown one pound of ground beef, the customer can input that they browned one pound of ground turkey prior to proceeding to a next instruction.

In various embodiments, the customer may be presented with one or more questions and possible answers to obtain the customer input. In some additional embodiments, the recipe may include additional instructions to elicit the customer input. For example, assume the recipe includes 15 steps. The recipe may include additional instructions between steps 7 and 8, as well as between steps 12 and 13, to ask the customer to taste the dish and indicate if the dish is too salty or not salty enough. This input can be used by the system to modify the recipe in real time as it is being used by the customer to increase or decrease an amount of salt identified in the recipe. Similarly, the system can output an audible request for the customer to provide input.

In various embodiments, the customer input may be inferred from the actions of the customer. For example, if the recipe calls for the customer to dice tomatoes, but the customer does not proceed to a next step for a threshold amount of time, then the system can infer that dicing tomatoes was difficult for the customer. Likewise, a camera or microphone can be utilized to capture images or audio of the customer using the recipe. If the customer is swearing while dicing tomatoes, then the system can analyze the captured audio to also infer that dicing tomatoes is difficult for the customer. Similarly, images of the resulting diced tomatoes can be analyzed to determine if the diced tomatoes were the diced appropriately to the right size. This information can be used to determine if canned diced tomatoes would be better for the customer in the future.

Process 700 continues at block 708, where the customer customizations from the customer input are stored. In some embodiments, the customer input may be stored locally or provided to another computing device, such as recipe-customization server 130.

In various embodiments, the customer customizations may be generated from the customer input by using a machine learning model that is trained to generate recipe customizations based on customer input. For example, if a customer increases the amount of salt used in a recipe, then the machine learning model may indicate that the customization is that the customer likes more salty food. As discussed in more detail herein, the system can use this information to modify the amount of salt identified in future recipes, rather than simply selecting more salty recipes.

After block 708, process 700 terminates or otherwise returns to a calling process to perform other actions.

Figure 8:
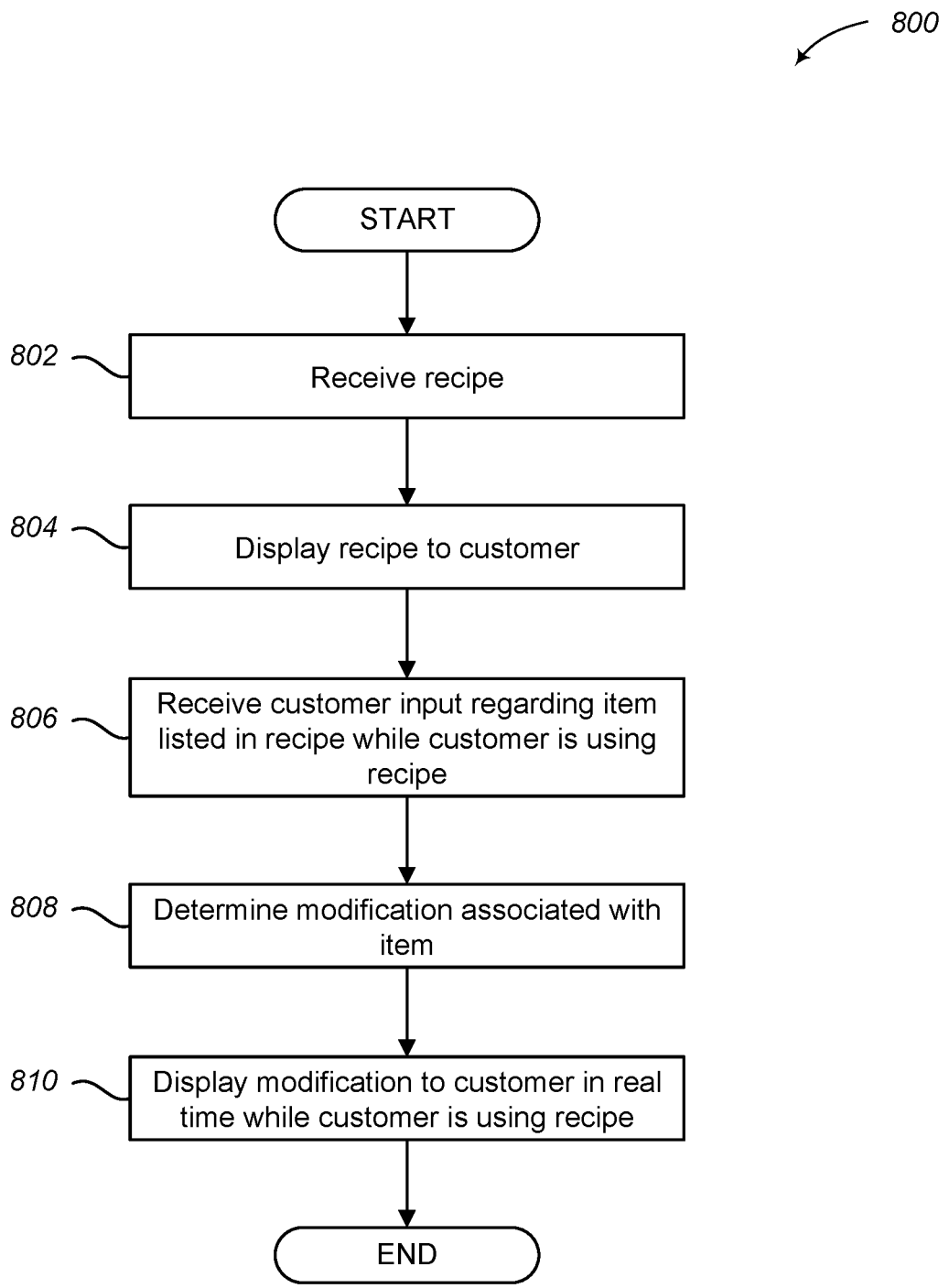
FIG. 8 illustrates a logical flow diagram showing one embodiment of a process for dynamically modifying a recipe in accordance with embodiments described herein.

FIG. 8 illustrates a logical flow diagram showing one embodiment of a process 800 for dynamically modifying a recipe in accordance with embodiments described herein. Briefly, process 800 may be used to modify one or more aspects of a recipe as the recipe is being used by a customer.

Process 800 begins, after a start block, at block 802, where a recipe is received. In various embodiments, block 802 may employ embodiments of block 702 in FIG. 7 to receive a recipe.

Process 800 proceeds to block 804, where the recipe is displayed to the customer. In various embodiments, block 804 may employ embodiments of block 704 in FIG. 7 to display the recipe to the customer.

Process 800 continues at block 806, where customer input is received regarding an item listed in the recipe. This input is received while the customer is using the recipe. As one example, the customer input may indicate that the customer is out of an ingredient that is identified in the recipe. As another example, the customer input may indicate that the customer dropped a particular ingredient on the floor and it is no longer usable. As yet another example, the customer input may indicate that the customer dropped a portion of an ingredient on the floor, or that customer did not receive the full amount of a certain ingredient in the delivery. This information can be used to modify the recipe to accommodate the less ingredient.

In some other embodiments, the customer input may be associated with a particular instruction, characteristic, or aspect of the recipe. For example, assume the recipe includes an instruction to "sear each of four steaks on medium-high heat for 6-12 minutes." The customer may indicate that the first steak was under-done at the 12 minute mark. As another example, the customer may indicate that the dish is too salty after step 3 of 10.

Process 800 proceeds next to block 808, where a modification associated with the item is determined in real time as the customer is using the recipe. In some embodiments, the recipe may include metadata or tags identifying which modification may be performed on the recipe or for specific items in the recipe. In other embodiments, a server or database may be queried for the modification.

The modification may include an item change, an item substitution, a recipe instruction change, other recipe characteristic change, etc. For example, if the recipe calls for parsnip, but the customer indicates that the parsnip is too green or rotting, then the modification may be to substitute sweet potatoes for the parsnip. As another example, if the customer input indicates that the dish is too salty, but the recipe later calls for one teaspoon of salt to be added, then the medication may be to reduce the salt amount to one-half teaspoon. As yet another example, the modification may be to change an oven or stove temperature or change the cooking time.

In various embodiments, the customer's preferences or previous customizations may be used to select or determine the modification. For example, if the customer indicates that the parsnip is too green or rotting and the modification is to substitute sweet potatoes for the parsnip, but the customer previously indicated that they did not like sweet potatoes (or used some other substitute), then the modification may be to substitute celery root for the parsnip.

Process 800 continues next at block 810, where the modification is displayed to the customer in real time while the customer is using the recipe. In some embodiments, the modification may be displayed to the customer before the customer proceeds to a next step or instruction in the recipe. In other embodiments, the modification may be displayed to the customer at some later time during use of the recipe or during some later step of the recipe. The modification may be noticeable to the customer, such as by crossing out the original ingredient and underlining the new or substitute ingredient. In various embodiments, the modification may not be noticeable to the customer. For example, the recipe may be modified to include the modification as if the recipe originally included the modification.

After block 810, process 800 terminates or otherwise returns to a calling process to perform other actions.

Figure 9A:
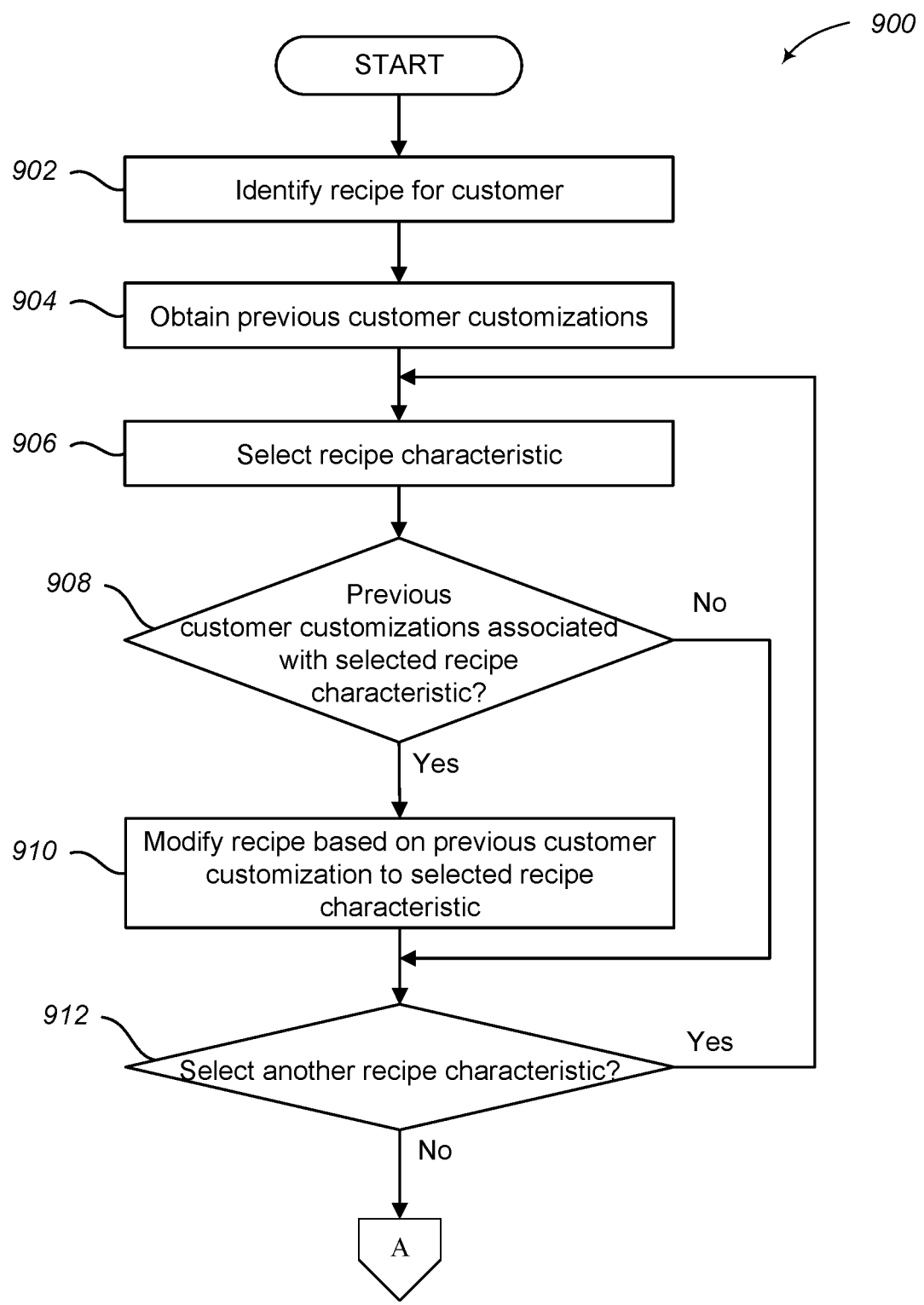
FIGS. 9A-9B illustrate a logical flow diagram showing another embodiment of a process for dynamically modifying a recipe in accordance with embodiments described herein.
Figure 9B:
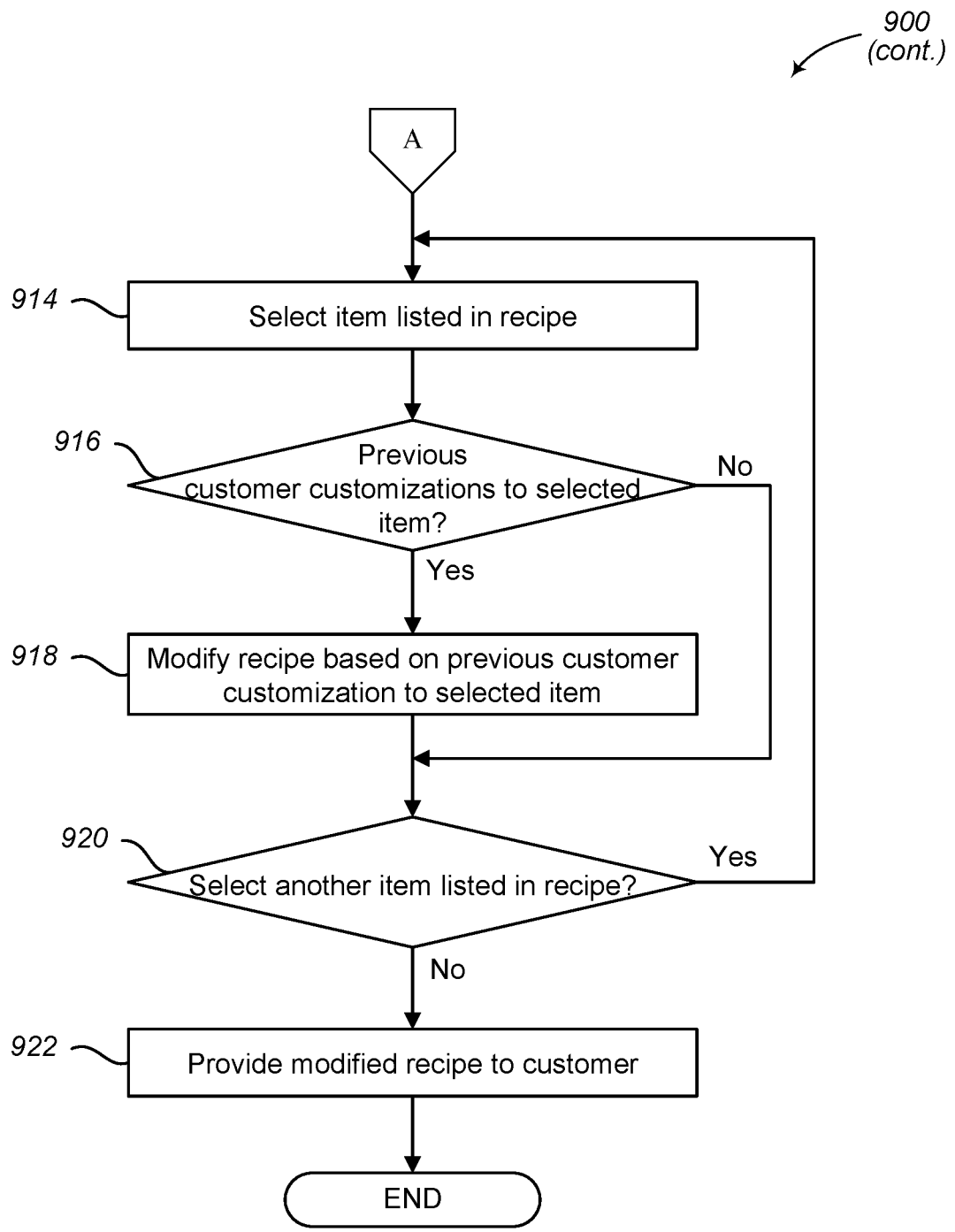

FIGS. 9A-9B illustrate a logical flow diagram showing another embodiment of a process 900 for dynamically modifying a recipe in accordance with embodiments described herein.

Process 900 begins, after a start block, at block 902 in FIG. 9A, where a recipe is identified for a customer. In some embodiments, the identified recipe may be a recipe that is selected to be provided to the customer, as discussed above.

Process 900 proceeds to block 904, where previous customer customizations are obtained. In various embodiments, the customer customizations are obtained over time as the customer provides input while using one or more recipes. As mentioned above, one or more machine learning mechanisms may be utilized to generate the customer customization for each separate customer based on the inputs provided by the separate customers. In some embodiments, customizations may also be generated from the inputs provided by multiple different customers. In various embodiments, the previous customer customizations may also include inferred preferences of the customer or customer-selected preferences.

Process 900 continues to block 906, where a characteristic of the recipe is selected. As mentioned above, the recipe characteristic may be associated with the taste of the recipe, an instruction in the recipe, or some other aspect of the recipe. In various embodiments, the recipe may be tagged or include metadata that identifies one or more recipe characteristics. Each recipe characteristic may be selected and processed in a select order.

Process 900 proceeds next to decision block 908, where a determination is made whether a previous customer customization is associated with the selected recipe characteristic. For example, if the recipe characteristic is a spicy level of the recipe, but the customer has provided no previous customizations associated with spice, then it may be determined that there are no previous customer customizations associated with the selected recipe characteristic. Conversely, if the recipe characteristic is for two people, but the customer has previously customized two-people recipes for three people, then it may be determined that there is a previous customer customization associated with the selected recipe characteristic. If a previous customer customization is associated with the selected recipe characteristic, then process 900 flows to block 910; otherwise, process 900 flows to decision block 912.

At block 910, the recipe is modified based on the previous customer customization that is associated with the selected recipe characteristics. This modification may include substituting an item, changing an item or ingredient amount, changing a cooking time, changing a cooking method (e.g., changing from stir-fry to sauté, or changing from deep-fry to air-fry, etc.), modifying a heating or cooking source (e.g., changing from grill to stovetop, or changing from microwave to oven, etc.), modifying a preparation of an item or ingredient (e.g., changing from frozen to thawed if the ingredient was previously thawed by the customer, changing from shredded to diced, etc.), changing a cooking temperature, changing a cooking step or instruction, changing an order of instructions, or some other modification. In some embodiments, the modification may be learned using one or more machine learning techniques or they may be set by an administrator. In various embodiments, the recipe may store or include possible modifications that can be made to the selected recipe characteristic. For example, in some embodiments, characterization boundaries may be stored such that the modification is selected from within the boundary.

In various embodiments, the modification may include generating one or more additional steps for the recipe. For example, if the customer has provided input or customizations indicating that they are confused when an instruction says "sear steak," then the modification may be to include additional sub-steps that instruct the customer how to sear a steak.

Process 900 continues next at decision block 912, where a determination is made whether another recipe characteristic is selected. Another recipe characteristic may be selected until each characteristic of the recipe is selected and processed for modifications. If another recipe characteristic is to be selected, process 900 loops to block 906 to select another recipe characteristic; otherwise, process 900 flows to block 914 in FIG. 9B.

At block 914 in FIG. 9B, an item listed in the recipe is selected. One or more recipe items may be selected and processed in a select order.

Process 900 proceeds to decision block 916, where a determination is made whether a previous customer customization is made to the selected item. For example, if the selected item is an ingredient that the customer has previously not changed, then it may be determined that there are no previous customer customizations to the selected item. Conversely, if the selected item is an ingredient that the customer routinely changes the quantity or amount, then it may be determined that there is a previous customer customization to the selected item. If a previous customer customization is made to the selected item, then process 900 flows to block 918; otherwise, process 900 flows to decision block 920.

At block 918, the recipe is modified based on the previous customer customizations to the selected item. As described herein, the modification may include substituting a different item for the selected item, changing the selected item amount, changing a preparation instruction for the selected item, or some other modification. In some embodiments, the modification may be to the selected items or it may be to another item. The modification may be learned using one or more machine learning techniques or they may be set by an administrator. In various embodiments, the recipe may store or include possible modifications that can be made to the selected item. For example, in some embodiments, item quantity boundaries may be stored such that the modification is selected from within the boundary.

Process 900 continues next at decision block 920, where a determination is made whether another item in the recipe is selected. Another item may be selected until each item in the recipe is selected and processed for modifications. If another recipe item is to be selected, process 900 loops to block 916 to select another item listed in the recipe; otherwise, process 900 flows to block 922.

At block 922, the modified recipe is provided to the customer. In some embodiments, the recipe is provided to the customer with an order, such as in block 316 in FIG. 3. In other embodiments, the modified recipe may be provided to the customer in response to the customer selecting the recipe, such that the customer can make the recipe. In various embodiments, providing the recipe to the customer may include sending at least one computer communication to the customer device that includes the modified recipe or the modifications to the recipe. In at least one embodiment, providing the recipe to the customer may include sending at least one computer communication to the customer device that causes the customer device to display the modified recipe.

After block 922, process 900 terminates or otherwise returns to a calling process to perform other actions.

Although the descriptions above include various examples, these examples are not to be exclusive or limiting. Rather, these examples are discussed to provide context to the description.

Figure 10:
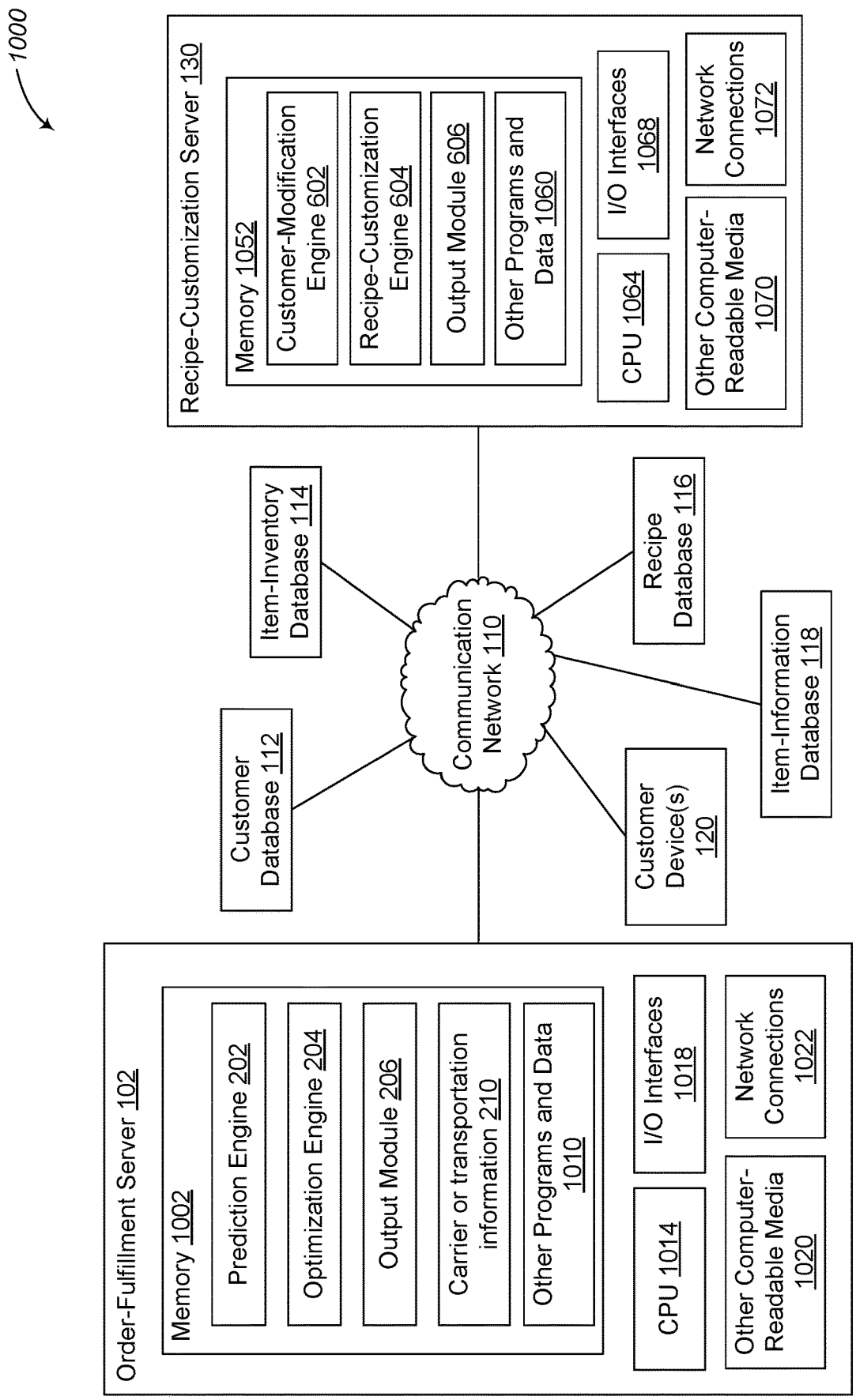
FIG. 10 shows a system diagram that describes various implementations of computing systems for implementing embodiments described herein.

FIG. 10 shows a system diagram that describes various implementations of computing systems for implementing embodiments described herein. System 1000 includes an order-fulfillment server 102, recipe-customization server 130, customer database 112, item-inventory database 114, recipe database 116, item-information database 118, and customer devices 120, which may communicate with one another via network 110.

The order-fulfillment server 102 receives an order request for a customer from a customer device 120, predicts which recipes the customer will enjoy, optimizes those predicted recipes into a plurality of sets of recipes, and selects a set of recipes to provide to the customer, as described herein. One or more special-purpose computing systems may be used to implement the order-fulfillment server 102. Accordingly, various embodiments described herein may be implemented in software, hardware, firmware, or in some combination thereof. The order-fulfillment server 102 may include memory 1002, one or more central processing units (CPUs) 1014, I/O interfaces 1018, other computer-readable media 1020, and network connections 1022.

Memory 1002 may include one or more various types of non-volatile and/or volatile storage technologies. Examples of memory 1002 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 1002 may be utilized to store information, including computer-readable instructions that are utilized by CPU 1014 to perform actions, including embodiments described herein.

Memory 1002 may have stored thereon prediction engine 202, optimization engine 204, and output module 206. The prediction engine 202 is configured to utilize customer preferences and historical customer actions to predict which recipes the customer will enjoy, as described herein. The optimization engine 204 is configured to obtain the predicted recipes from the prediction engine 202 and generate a plurality of optimized sets of recipes, as described herein. The output module 206 is configured to select one of the optimized sets of recipes and initiate the fulfillment of the customer's order, as described herein. In various embodiments, the prediction engine 202, the optimization engine 204, and the output module 206 may communicate with the customer database 112, the item-inventory database 114, the recipe database 116, or the item-information database 118 to obtain various information utilized in the prediction and optimization of recipes for a customer. Although the prediction engine 202, the optimization engine 204, and the output module 206 are illustrated as separate components, embodiments are not so limited. Rather, one or more computing components or modules may be employed to perform the functionality of the prediction engine 202, the optimization engine 204, and the output module 206.

Memory 1002 may also store carrier or transportation information 210 and other programs and data 1010. The carrier or transportation information 210 may include information or details regarding a current status of item carriers, previous transportation behavior or results of item carriers or order delivery transportation services, etc. Although the carrier or transportation information 210 is illustrated as being stored in memory 1002 of the order-fulfillment server 102, embodiments are not so limited. In some embodiments, the carrier or transportation information 210 may be stored by another database or computing device that is separate or remote from the order-fulfillment server 102. The other programs and data 1010 may include operating systems or other information. For example, in some embodiments, the data stored by the customer database 112, the item-inventory database 114, the recipe database 116, or the item-information database 118, or some combination thereof, may be stored in the memory 1002 of the order-fulfillment server 102.

In various embodiments, the network connections 1022 include transmitters and receivers (not illustrated) to send and receive data as described herein. I/O interfaces 1018 may include one or more data input or output interfaces that can be used to receive information from or display information to an administrator. For example, the I/O interfaces 1018 may include an input interface to receive hard constraints, soft constraints, or modifications thereof. Other computer-readable media 1020 may include other types of stationary or removable computer-readable media, such as removable flash drives, external hard drives, or the like.

The recipe-customization server 130 receives previous customizations to one or more recipes for a customer from a customer device 120, dynamically modifies recipes in which to provide to the customer, or dynamically modifies a recipe as the customer is using the recipe, as described herein. One or more special-purpose computing systems may be used to implement the recipe-customization server 130. Accordingly, various embodiments described herein may be implemented in software, hardware, firmware, or in some combination thereof. The recipe-customization server 130 may include memory 1052, one or more central processing units (CPUs) 1064, I/O interfaces 1068, other computer-readable media 1070, and network connections 1072.

Memory 1052 may include one or more various types of non-volatile and/or volatile storage technologies similar to memory 1002. Memory 1052 may be utilized to store information, including computer-readable instructions that are utilized by CPU 1064 to perform actions, including embodiments described herein.

Memory 1052 may have stored thereon customer-modification engine 602, recipe-customization engine 604, and output module 606. The customer-modification engine 602 is configured to receive customer customizations and store those customizations for use by the recipe-customization engine 604, as described herein. The recipe-customization engine 604 is configured to obtain the previous customer customizations and dynamically modify recipes for customers based on those previous customer customizations, as described herein. The output module 606 is configured to provide the modified recipes to the customer's computing device, as described herein. In various embodiments, the customer-modification engine 602 and the recipe-customization engine 604 may communicate with the customer database 112, the recipe database 116, or the item-information database 118 to obtain various information utilized in dynamic modification of recipes for a customer. Although the customer-modification engine 602, the recipe-customization engine 604, and the output module 606 are illustrated as separate components, embodiments are not so limited. Rather, one or more computing components or modules may be employed to perform the functionality of the customer-modification engine 602, recipe-customization engine 604, and the output module 606.

Memory 1052 may also store other programs and data 1060. The other programs and data 1060 may include operating systems or other information. For example, in some embodiments, the data stored by the customer database 112, the recipe database 116, or the item-information database 118, or some combination thereof, may be stored in the memory 1052 of the recipe-customization server 130.

In various embodiments, the network connections 1072 include transmitters and receivers (not illustrated) to send and receive data as described herein. I/O interfaces 1068 may include one or more data input or output interfaces that can be used to receive information from or display information to an administrator. For example, the I/O interfaces 1068 may include an input interface to receive specific item or recipe modifications or substitutions. Other computer-readable media 1070 may include other types of stationary or removable computer-readable media, such as removable flash drives, external hard drives, or the like.

The order-fulfillment server 102, the recipe-customization server 130, the customer database 112, the item-inventory database 114, the recipe database 116, the item-information database 118, and the customer devices 120 are described in more detail above. The customer database 112, the item-inventory database 114, the recipe database 116, and the item-information database 118 utilize processors, memory, network connections, and other computing components similar to the order-fulfillment server 102 or the recipe-customization server 130. But those components are not illustrated in FIG. 10 to improve readability of the figure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
obtaining, by a computing device, first constraints and second constraints for a customer, wherein the first constraints cannot be violated by a recipe, item, or set of recipes for the customer, and wherein the second constraints include tradeoff values associated with a recipe, item, or set of recipes for the customer;
employing, by the computing device, an artificial intelligence model to select a plurality of predicted recipes from a plurality of recipes for the customer based on preferences of the customer;
generating, by the computing device, a plurality of sets of recipes from the plurality of predicted recipes based on the first constraints;
scoring, by the computing device, each recipe set of the plurality of sets of recipes based on the second constraints;
selecting, by the computing device, a set of recipes from the plurality of sets of recipes for the customer based on the scores for the plurality of sets of recipes;
presenting, by the computing device, a first recipe from the selected set of recipes to the customer, wherein the first recipe includes a first plurality of items and a first plurality of recipe characteristics;
obtaining, by the computing device, images of the customer preparing the first recipe at a first time;
analyzing, by the computing device, the images to determine at least one action of the customer;
determining, by the computing device, a recipe characteristic of the first plurality of recipe characteristics and a use of a non-food item of the first plurality of items associated with the at least one action of the customer based on the analysis of the images;
identifying, by the computing device, a second recipe from the selected set of recipes for the customer, wherein the second recipe includes a second plurality of items, a second plurality of recipe characteristics, and a plurality of possible modifications that includes a first possible modification to an item of the plurality of items and a second possible modification to a recipe characteristic of the second plurality of recipe characteristics;
determining, by the computing device, whether the second plurality of recipe characteristics includes the determined recipe characteristic associated with the at least one action of the customer;
determining, by the computing device, whether the second plurality of items includes the determined non-food item associated with the at least one action of the customer;
in response to determining that the second plurality of recipe characteristics includes the determined recipe characteristic and that the second plurality of items includes the determined non-food item:
identifying, by the computing device, a first modification from the plurality of possible modifications included in the second recipe based on the at least one action of the customer when preparing the first recipe during the first time;
modifying, by the computing device, at least one recipe characteristic of the second recipe using the first modification;
identifying, by the computing device, a second modification from the plurality of possible modifications included in the second recipe based on the at least one action of the customer when preparing the first recipe during the first time; and
modifying, by the computing device, the use of the non-food item in the second recipe using the second modification; and
presenting, by the computing device, the modified second recipe to the customer at a second time that is after the first time.

2. The method of claim 1, wherein modifying the use of the non-food item in the second recipe comprises:

determining, by the computing device, that the customer added a new item when preparing the first recipe that was not included in the first plurality of items in the first recipe; and adding, by the computing device, the new item to the second recipe.

3. The method of claim 1, wherein modifying the at least one recipe characteristic of the second recipe comprises:

determining, by the computing device, a difficulty of one or more actions of the at least one action of the customer for the at least one recipe characteristic; and modifying, by the computing device, the at least one recipe characteristic in the second recipe based on the one or more actions and the determined difficulty.

4. The method of claim 1, wherein modifying the at least one recipe characteristic of the second recipe comprises:

determining, by the computing device, a difficulty of one or more actions of the at least one action of the customer for the at least one recipe characteristic; and modifying, by the computing device, the second recipe to include additional steps relative to the at least one recipe characteristic based on the one or more actions and the determined difficulty.

5. The method of claim 1, wherein modifying the at least one recipe characteristic of the second recipe comprises:

determining, by the computing device, an amount of time it took the customer to perform one or more actions of the at least one action associated with the at least one recipe characteristic when preparing the first recipe;

determining, by the computing device, that the amount of time exceeded a threshold value for the at least one recipe characteristic; and modifying, by the computing device, the at least one recipe characteristic in the second recipe.

6. The method of claim 1, further comprising:

learning the modification to the at least one recipe characteristic using a machine learning technique.

7. The method of claim 1, further comprising:

identifying, by the computing device, a second non-food item in the second plurality of items associated with the non-food item in the second recipe; and modifying, by the computing device, use of the second non-food item in the second recipe.

8. A computing system, comprising:

a memory that stores computer instructions; and a processor that is configured to execute the computer instructions to:

obtain first constraints and second constraints for a customer, wherein the first constraints cannot be violated by a recipe, item, or set of recipes for the customer, and wherein the second constraints include tradeoff values associated with a recipe, item, or set of recipes for the customer;

employ an artificial intelligence model to select a plurality of predicted recipes from a plurality of recipes for the customer based on preferences of the customer;

generate a plurality of sets of recipes from the plurality of predicted recipes based on the first constraints;

score each recipe set of the plurality of sets of recipes based on the second constraints;

select a set of recipes from the plurality of sets of recipes for the customer based on the scores for the plurality of sets of recipes;

present a first recipe from the selected set of recipes to the customer, wherein the first recipe includes a first plurality of items and a first plurality of recipe characteristics;

obtain images of the customer preparing the first recipe at a first time;

analyze the images to determine at least one action of the customer;

determine a recipe characteristic of the first plurality of recipe characteristics and a non-food item of the first plurality of items associated with the at least one action of the customer based on the analysis of the images;

identify a second recipe from the selected set of recipes for the customer, wherein the second recipe includes a second plurality of items, a second plurality of recipe characteristics, and a plurality of possible modifications that includes a first possible modification to an item of the plurality of items and a second possible modification to a recipe characteristic of the second plurality of recipe characteristics;

determine whether the second plurality of recipe characteristics includes the determined recipe characteristic associated with the at least one action of the customer;

determine whether the second plurality of items includes the determined non-food item associated with the at least one action of the customer;

in response to determining that the second plurality of recipe characteristics includes the determined recipe characteristic and that the second plurality of items includes the determined non-food item:

identify a first modification from the plurality of possible modifications included in the second recipe based on the at least one action of the customer when preparing the first recipe during the first time;

modify at least one recipe characteristic of the second recipe using the first modification;

identify a second modification from the plurality of possible modifications included in the second recipe based on the at least one action of the customer when preparing the first recipe during the first time; and modify the use of the non-food item in the second recipe using the second modification; and present the modified second recipe to the customer at a second time that is after the first time.

9. A non-transitory computer-readable medium storing computer instructions that, when executed by at least one processor, cause the at least one processor to perform operations, the operations comprising:

obtaining first constraints and second constraints for a customer, wherein the first constraints cannot be violated by a recipe, item, or set of recipes for the customer, and wherein the second constraints include tradeoff values associated with a recipe, item, or set of recipes for the customer;

employing an artificial intelligence model to select a plurality of predicted recipes from a plurality of recipes for the customer based on preferences of the customer;

generating a plurality of sets of recipes from the plurality of predicted recipes based on the first constraints;

scoring each recipe set of the plurality of sets of recipes based on the second constraints;

selecting a set of recipes from the plurality of sets of recipes for the customer based on the scores for the plurality of sets of recipes:

presenting a first recipe from the selected set of recipes to the customer, wherein the first recipe includes a first plurality of items and a first plurality of recipe characteristics;

obtaining images of the customer preparing the first recipe at a first time;

analyzing the images to determine at least one action of the customer;

determining a recipe characteristic of the first plurality of recipe characteristics and a non-food item of the first plurality of items associated with the at least one action of the customer based on the analysis of the images;

identifying a second recipe from the selected set of recipes for the customer, wherein the second recipe includes a second plurality of items, a second plurality of recipe characteristics, and a plurality of possible modifications that includes a first possible modification to an item of the plurality of items and a second possible modification to a recipe characteristic of the second plurality of recipe characteristics;

determining whether the second plurality of recipe characteristics includes the determined recipe characteristic associated with the at least one action of the customer;

determining whether the second plurality of items includes the determined non-food item associated with the at least one action of the customer;

in response to determining that the second plurality of recipe characteristics includes the determined recipe characteristic and that the second plurality of items includes the determined non-food item:

identifying a first modification from the plurality of possible modifications included in the second recipe based on the at least one action of the customer when preparing the first recipe during the first time;

modifying at least one recipe characteristic of the second recipe using the first modification;

identifying a second modification from the plurality of possible modifications included in the second recipe based on the at least one action of the customer when preparing the first recipe during the first time; and modifying the use of the non-food item in the second recipe using the second modification; and presenting the modified second recipe to the customer at a second time that is after the first time.

* * * * *

UNITED STATES PATENT AND TRADEMARK OFFICE
CERTIFICATE OF CORRECTION

| | | |
|---|---|---|
| PATENT NO. | : 12,086,764 B2 | Page 1 of 1 |
| APPLICATION NO. | : 18/159542 | |
| DATED | : September 10, 2024 | |
| INVENTOR(S) | : Alex Weinstein et al. | |

It is certified that error appears in the above-identified patent and that said Letters Patent is hereby corrected as shown below:

In the Claims

Column 23, Claim 8, Line 60:
"customer,"
Should read:
--customer;--.

Column 23, Claim 8, Line 62:
"first constraints:"
Should read:
--first constraints;--.

Column 25, Claim 9, Line 3:
"of recipes:"
Should read:
--of recipes;--.

Signed and Sealed this
Twenty-second Day of October, 2024

Katherine Kelly Vidal
*Director of the United States Patent and Trademark Office*